United States Patent
Nonaka et al.

(10) Patent No.: US 9,521,329 B2
(45) Date of Patent: Dec. 13, 2016

(54) DISPLAY DEVICE, DISPLAY METHOD, AND COMPUTER-READABLE RECORDING MEDIUM

(71) Applicant: OLYMPUS CORPORATION, Hachioji-shi, Tokyo (JP)

(72) Inventors: Osamu Nonaka, Sagamihara-shi (JP); Mai Yamaguchi, Tokyo (JP); Yuiko Uemura, Tokyo (JP); Tomomi Uemura, Jakarta (ID); Sachie Yamamoto, Tokyo (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/634,098

(22) Filed: Feb. 27, 2015

(65) Prior Publication Data
US 2015/0172553 A1    Jun. 18, 2015

Related U.S. Application Data

(63) Continuation of application No. PCT/JP2014/065936, filed on Jun. 16, 2014.

(30) Foreign Application Priority Data

Oct. 16, 2013    (JP) .................................. 2013-215753

(51) Int. Cl.
*H04N 5/222*    (2006.01)
*H04N 5/232*    (2006.01)
(Continued)

(52) U.S. Cl.
CPC .......... *H04N 5/23293* (2013.01); *G03B 17/04* (2013.01); *H04N 5/23219* (2013.01);
(Continued)

(58) Field of Classification Search
CPC ............ H04N 5/23219; H04N 5/23222; H04N 5/23212; H04N 5/2251; H04N 5/2252; H04N 5/23293; H04N 5/23216
(Continued)

(56) References Cited

U.S. PATENT DOCUMENTS

2003/0197779 A1* 10/2003 Zhang .................... H04N 7/144
                                                        348/14.16
2004/0001614 A1*  1/2004 Russon .............. G06K 9/00597
                                                        382/117
(Continued)

FOREIGN PATENT DOCUMENTS

CN    101021943 A    8/2007
CN    101930543 A    12/2010
(Continued)

OTHER PUBLICATIONS

Written Opinion issued in corresponding International Patent Appln. No. PCT/JP2014/065936 on Sep. 9, 2014. (English Translation Provided).
(Continued)

*Primary Examiner* — Sinh Tran
*Assistant Examiner* — Xi Wang
(74) *Attorney, Agent, or Firm* — Volpe and Koenig, P.C.

(57) ABSTRACT

A display device includes an imaging unit configured to capture an image of an object and to generate image data of the object, a display unit configured to display the image corresponding to the image data generated by the imaging unit, and a display controller configured to cause the display unit to display a sample image in which at least a line of sight of the object has been changed when the imaging unit captures the image of the object. An imaging direction of the imaging unit and a display direction of the display unit are matched. The sample image is an object image in which the
(Continued)

line of sight has changed from front to a direction other than the front.

9 Claims, 20 Drawing Sheets

(51) Int. Cl.
*G03B 17/04* (2006.01)
*G03B 15/00* (2006.01)

(52) U.S. Cl.
CPC ..... *H04N 5/23222* (2013.01); *H04N 5/23296* (2013.01); *G03B 15/00* (2013.01); *G03B 2217/002* (2013.01); *G03B 2217/18* (2013.01)

(58) Field of Classification Search
USPC .......................... 348/333.01, 333.02, 333.03, 333.05,348/333.11, 333.12, 333.06
See application file for complete search history.

(56) References Cited

U.S. PATENT DOCUMENTS

| | | | | |
|---|---|---|---|---|
| 2007/0002157 A1* | 1/2007 | Shintani | ............. | H04N 5/23293 348/333.06 |
| 2010/0156781 A1* | 6/2010 | Fahn | ................. | H04M 1/72544 345/156 |
| 2010/0157128 A1* | 6/2010 | Choi | ................. | H04N 5/23248 348/333.03 |
| 2011/0128395 A1* | 6/2011 | Choi | .................. | G06K 9/00281 348/222.1 |
| 2013/0070046 A1* | 3/2013 | Wolf | ...................... | H04N 7/144 348/14.16 |
| 2013/0222644 A1 | 8/2013 | Son et al. | | |
| 2015/0206354 A1* | 7/2015 | Shibuhisa | .......... | H04N 5/23219 348/46 |

FOREIGN PATENT DOCUMENTS

| | | | | | |
|---|---|---|---|---|---|
| CN | 102761705 A | 10/2012 | | | |
| CN | 102780873 A | 11/2012 | | | |
| CN | 103310186 A | 9/2013 | | | |
| JP | 2003-299005 A | 10/2003 | | | |
| JP | 2005-092657 A | 4/2005 | | | |
| JP | 2006-074368 A | 3/2006 | | | |
| JP | 2007-006016 A | 1/2007 | | | |
| JP | 2007006016 A | * | 1/2007 | ......... | H04N 5/23219 |
| JP | 2009-246408 A | 10/2009 | | | |
| JP | 2009224994 A | 10/2009 | | | |
| JP | 2013-175802 A | 9/2013 | | | |
| JP | 2013-182616 A | 9/2013 | | | |

OTHER PUBLICATIONS

International Search Report issued in corresponding International Patent Appln. No. PCT/JP2014/065936 on Sep. 9, 2014.
Office Action mailed in corresponding Chinese Application No. 201480002183.9 on Oct. 30, 2015, consisting of 8 pp.

* cited by examiner

DISPLAY DEVICE, DISPLAY METHOD, AND COMPUTER-READABLE RECORDING MEDIUM

CROSS-REFERENCE TO RELATED APPLICATIONS

This application is a continuation of PCT international application Ser. No. PCT/JP2014/065936 filed on Jun. 16, 2014 which designates the United States, incorporated herein by reference, and which claims the benefit of priority from Japanese Patent Application No. 2013-215753, filed on Oct. 16, 2013, incorporated herein by reference.

BACKGROUND

1. Technical Field

The disclosure relates to a display device for displaying an image corresponding to image data or advice on imaging related to capturing images, a method of displaying advice on imaging related to capturing images, and a computer-readable recording medium.

2. Related Art

In recent years, in imaging devices such as digital cameras, a technology is known, which is capable of revolving a display monitor that displays an image, around a main body that generates image data from a photographer side to an object side (see Japanese Patent Application Laid-open No. 2013-175802). This technology enables a photographer to perform self-photographing shooting to capture himself/herself as an object by revolving the display monitor from the photographer side to the object side.

SUMMARY

In accordance with some embodiments, a display device, a display method, and a computer-readable recording medium are presented.

In some embodiments, a display device includes: an imaging unit configured to capture an image of an object and to generate image data of the object; a display unit configured to display the image corresponding to the image data generated by the imaging unit; and a display controller configured to cause the display unit to display a sample image in which at least a line of sight of the object has been changed when the imaging unit captures the image of the object. An imaging direction of the imaging unit and a display direction of the display unit are matched. The sample image is an object image in which the line of sight has changed from front to a direction other than the front.

In some embodiments, a display method is executed by a display device that includes: an imaging unit configured to capture an image of an object and to generate image data of the object; and a display unit configured to display the image corresponding to the image data generated by the imaging unit, wherein an imaging direction of the imaging unit and a display direction of the display unit are matched. The method includes a displaying step of displaying, on the display unit, a sample image in which at least a line of sight of the object has been changed when the imaging unit captures the image of the object. The sample image is an object image in which the line of sight has changed from front to a direction other than the front.

In some embodiments, a non-transitory computer readable recording medium with an executable program stored thereon is provided. The program instructs a display device that includes: an imaging unit configured to capture an image of an object and to generate image data of the object; and a display unit configured to display the image corresponding to the image data generated by the imaging unit, wherein an imaging direction of the imaging unit and a display direction of the display unit are matched, to perform a displaying step of displaying, on the display unit, a sample image in which at least a line of sight of the object has been changed when the imaging unit captures the image of the object. The sample image is an object image in which the line of sight has changed from front to a direction other than the front.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, modes for carrying out the invention (hereinafter, referred to as "embodiments") will be described with reference to the drawings. Further, hereinafter, an example of an imaging device that mounts a display device will be described. Note that the present invention is not limited by the embodiments below. The same reference signs are used to designate the same elements throughout the drawings.

First Embodiment

Figure 1:
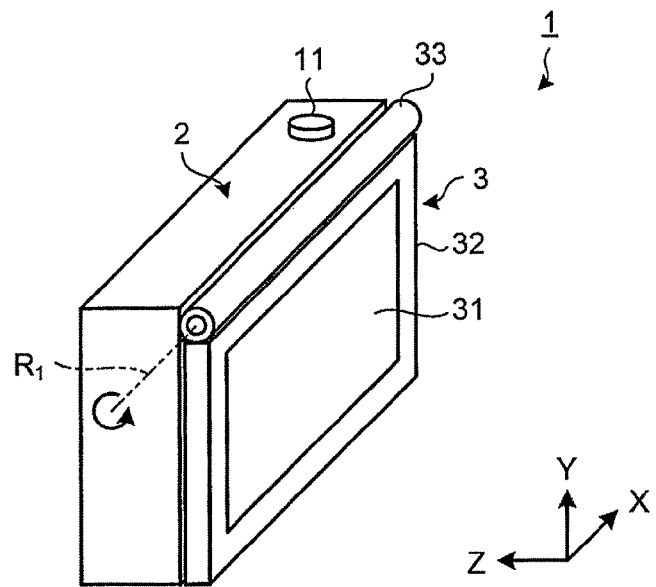
FIG. 1 is a perspective view illustrating a configuration of a side of an imaging device, the side facing a photographer, according to a first embodiment of the present invention.
Figure 2:
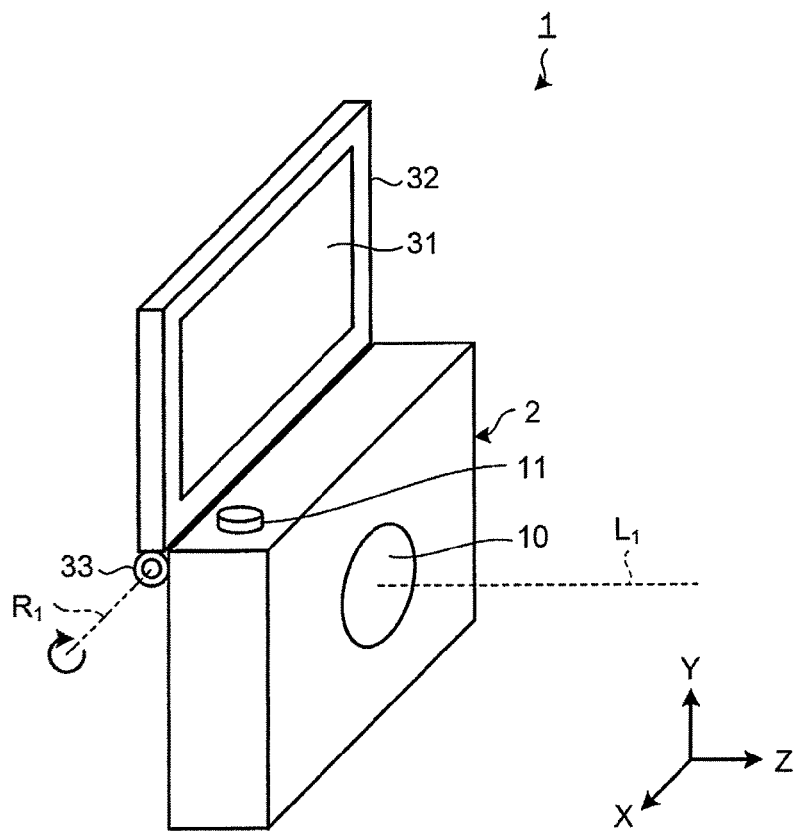
FIG. 2 is a perspective view illustrating a configuration of a side of the imaging device, the side facing an object, according to the first embodiment of the present invention.
Figure 3:
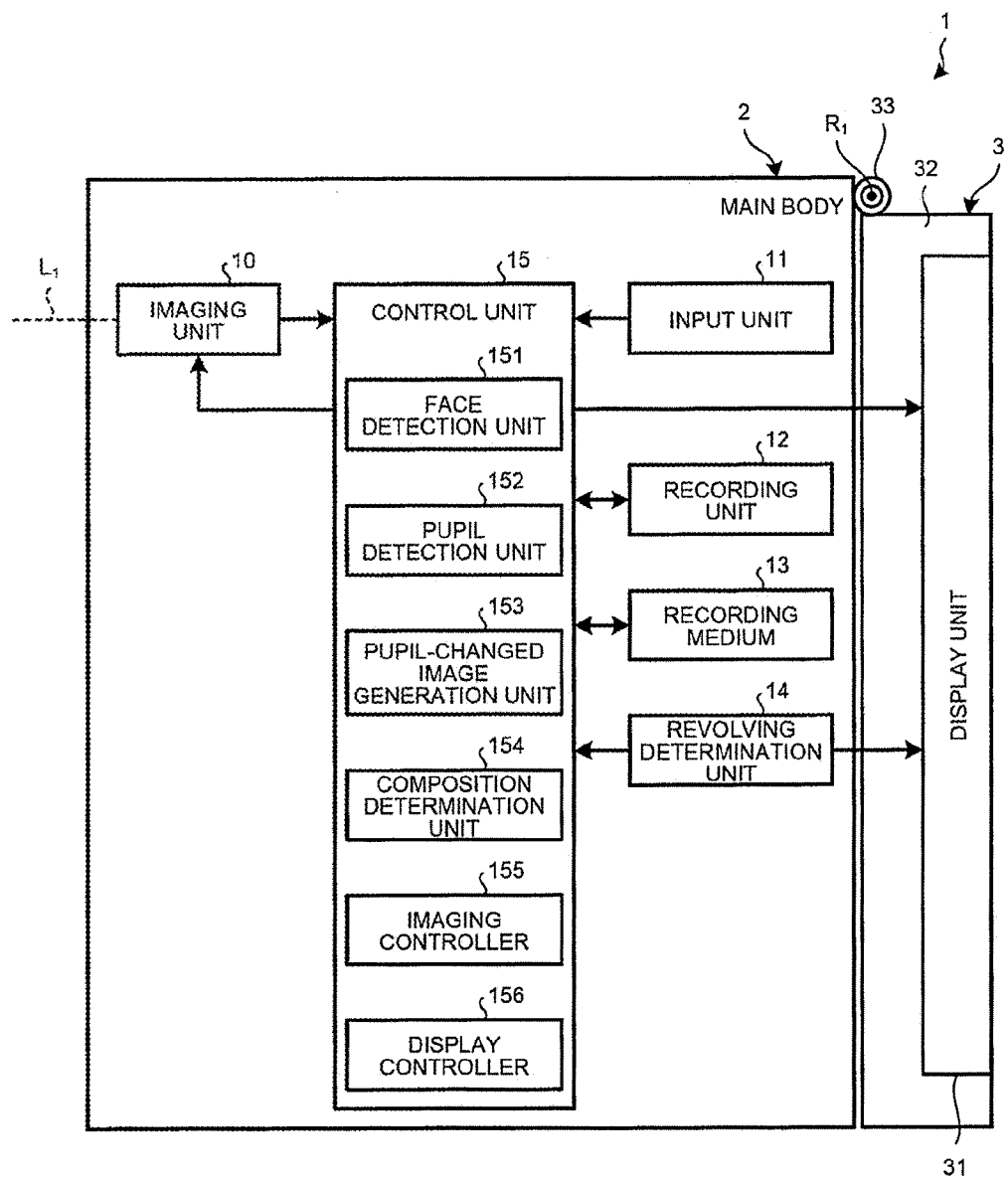
FIG. 3 is a block diagram illustrating a functional configuration of the imaging device according to the first embodiment of the present invention.

FIG. 1 is a perspective view illustrating a configuration of a side (back surface side) of an imaging device, the side facing a photographer, according to the present invention. FIG. 2 is a perspective view illustrating a side (front surface side) of the imaging device, the side facing an object, according to the present invention. FIG. 3 is a block diagram illustrating a functional configuration of the imaging device according to the present invention. Note that, in FIGS. 1 and 2, a width direction of an imaging device 1 is an X axis, a height direction of the imaging device 1 is a Y axis, and a direction of an optical axis $L_1$ of the imaging device 1 is a Z axis.

The imaging device 1 illustrated in FIGS. 1 to 3 includes a main body 2 that captures an object and generates image data of the object, and a display mechanism 3 turnably provided on the main body 2 from the photographer side (back surface side) to the object side (front surface side), and capable of displaying an image corresponding to the image data generated by the main body 2.

First, a configuration of the main body 2 will be described. The main body 2 includes an imaging unit 10, an input unit 11, a recording unit 12, a recording medium 13, a revolving determination unit 14, and a control unit 15.

The imaging unit 10 continuously images a specified visual field area under control of the control unit 15, and generates a plurality of temporally continuous image data. The imaging unit 10 is configured from a plurality of lenses, an optical system that focuses an object image, diaphragm that adjusts a quantity of light of the optical system, an imaging element such as a charge coupled device (CCD) or a complementary metal oxide semiconductor (CMOS) that receives the object image focused by the optical system and performs photoelectric conversion to generate image data, a shutter that sets a state of the imaging element to an exposure state or a shading state, a signal processing unit that applies specified analog processing to the image data generated by the imaging element, an A/D converter that applies A/D conversion to analog image data input from the signal processing unit to generate digital image data, and outputs the digital image data to the control unit 15, and a timing generator that generates imaging timing of the imaging element.

The input unit 11 receives an input of an instruction signal that instructs various operations related to the imaging device 1. The input unit 11 is configured from a power supply switch that switches a power supply state of the imaging device 1 to an ON state or an OFF state, a release switch that receives an input of a release signal that instructs the imaging device 1 to capture images, and the like.

The recording unit 12 records image data input through the control unit 15, information in processing by the imaging device 1, various programs for operating the imaging device 1, a program according to the first embodiment, various data used during execution of the program, and the like. The recording unit 12 is configured from a synchronous dynamic random access memory (SDRAM), a flash memory, and the like.

The recording medium 13 records image data input through the control unit 15. The recording medium 13 is configured from a memory card mounted from an outside of the imaging device 1, and is detachably mounted to the imaging device 1 through a memory I/F (not illustrated). Image data and moving image data to which processing has been applied by the control unit 15 described below are written in the recording medium 13. Further, the image data or the moving image data recorded by the control unit 15 is read from the recording medium 13.

The revolving determination unit 14 determines a revolving state of the display mechanism 3, and outputs a determination result to the control unit 15. To be specific, the revolving determination unit 14 determines whether a display area of a display unit 31 of the display mechanism 3 is turned to the front surface side with respect to the main body 2, and the display area of the display unit 31 faces the front surface side, and outputs a determination result to the control unit 15.

The control unit 15 transfers instructions and data corresponding to respective units that configure the imaging device 1 to comprehensively control an operation of the imaging device 1. The control unit 15 is configured from a central processing unit (CPU), and the like.

A detailed configuration of the control unit 15 will be described. The control unit 15 includes a face detection unit 151, a pupil detection unit 152, a pupil-changed image generation unit 153, a composition determination unit 154, an imaging controller 155, and a display controller 156.

The face detection unit 151 detects a face of an object in an image corresponding to image data generated by the imaging unit 10. To be specific, the face detection unit 151 detects a face of a person included in an image corresponding to image data generated by the imaging unit 10 with pattern matching. For example, the face detection unit 151 detects a position of the face in the image using pattern matching, and then detects positions of characteristic points of the face such as eyes, a nose, and a mouse, thereby to detect a position of the face, a size (an area) of the face, a direction of the face, an angle (an inclination) of the face, and an expression (a smiling face, or the like) of the face. Note that the face detection unit 151 may detect not only a face of a person, but also a face of an animal such as a dog or a cat. Further, the face detection unit 151 may detect a face of a person using a known technology, other than the pattern matching.

The pupil detection unit 152 detects pupils of the face of the object detected by the face detection unit 151. To be specific, the pupil detection unit 152 detects the pupils (a pupil area) by applying specified processing, for example, grayscale processing to eyes (an eye area) of the face in the object detected by the face detection unit 151, and then performing binarization processing.

The pupil-changed image generation unit 153 generates pupil-changed image data in which a position of the pupil area in a sclera area (an area of white of the eyes) of the object has been changed, based on a detection result detected by the pupil detection unit 152. To be specific, the pupil-changed image generation unit 153 applies trimming processing to the pupil area detected by the pupil detection unit 152 to generate a pupil image, and superimposes the pupil image on a specified area of the sclera area, for example, on a right end portion, and applies interpolating processing of interpolating pixels of white or a surrounding sclera area into the pupil area to which the trimming processing has been applied, thereby to generate the pupil-changed image data in which a line of sight of the object has been changed. For example, in a case where positions of pupils of an object detected by the pupil detection unit 152 are in the front (center), the pupil-changed image generation unit 153 moves the pupils to the right and left to generate two pupil-changed image data having lines of sight different from each other. Note that the pupil-changed image generation unit 153 may generate the pupil-changed image data in which the lines of sight of the object have been changed, based on outlines of respective parts of the face detected by the face detection unit 151 and the pupils detected by the pupil detection unit 152, using morphing processing of a known technology.

The composition determination unit 154 determines whether a composition of the object in a sample image selected by an instruction signal, an input of which has been received by the input unit 11, and a composition of the object in an image corresponding to the image data generated by the imaging unit 10 are matched. To be specific, the composition determination unit 154 determines whether positions of characteristic points of parts of the object in the sample image, for example, eyes, a nose, mouse, and the like, and characteristics of parts of the object in the image are matched. Note that the composition determination unit 154 may only determine whether positions of pupils in a sclera area of the object are matched.

The imaging controller 155 controls starting of a capturing operation in the imaging device 1 when a release signal has been input from the input unit 11. Here, the capturing operation in the imaging device 1 is to record the image data generated by the imaging unit 10 in the recording medium 13. Further, the imaging controller 155 creates a moving image file in the recording medium 13 when an instruction signal that instructs capturing a moving image has been input from the input unit 11, and sequentially records (stores) the image data sequentially generated by the imaging unit 10 in the moving image file. Further, the imaging controller 155 causes the imaging unit 10 to capture an image when the composition determination unit 154 has determined that the composition of the object in the sample image and the composition of the object in the image corresponding to the image data generated by the imaging unit 10 are matched.

The display controller 156 causes the display unit 31 of the display mechanism 3 described below to display the image corresponding to the image data. The display controller 156 displays, on the display unit 31 of the display mechanism 3, a sample image in which at least a line of sight of the object has been changed as advice on imaging when the imaging unit 10 captures an image of the object. Here, the sample image is an object image obtained such that the line of sight looking at the front is changed into a line of sight looking at a direction other than the front. To be specific, the display controller 156 displays, on the display unit 31 of the display mechanism 3 described below, the image corresponding to the image data generated by the pupil-changed image generation unit 153, in which pupil positions of the object have been changed.

Next, a configuration of the display mechanism 3 will be described. The display mechanism 3 includes the display unit 31, a movable unit 32, and a revolving support unit 33.

The display unit 31 displays an image corresponding to the image data input through the control unit 15 under control of the control unit 15. Here, the display of an image includes a rec-view display that displays image data immediately after captured for a given time (for example, three seconds), a playback display that plays back the image data recorded in the recording medium 13, a live view display that sequentially displays live view images corresponding to the image data continuously generated by the imaging unit 10 in time series, and the like. The display unit 31 is configured from a display panel made of liquid crystal or organic EL, a drive driver, and the like. Further, the display unit 31 appropriately displays operation information of the imaging device 1 and information related to capturing images. Further, the display unit 31 is turnably provided to the main body 2 of the imaging device 1 from the back surface side of the imaging device 1 to the front surface side of the imaging device 1 (see FIG. 1→FIG. 2).

The movable unit 32 includes the display unit 31, and is turnably provided to the main body 2 around one end of the main body 2 through the revolving support unit 33 such as a hinge. To be specific, the movable unit 32 is turnably provided from the back surface side to the front surface side of the main body 2 around an axis $R_1$ of the revolving support unit 33 (see FIG. 2).

Figure 4:
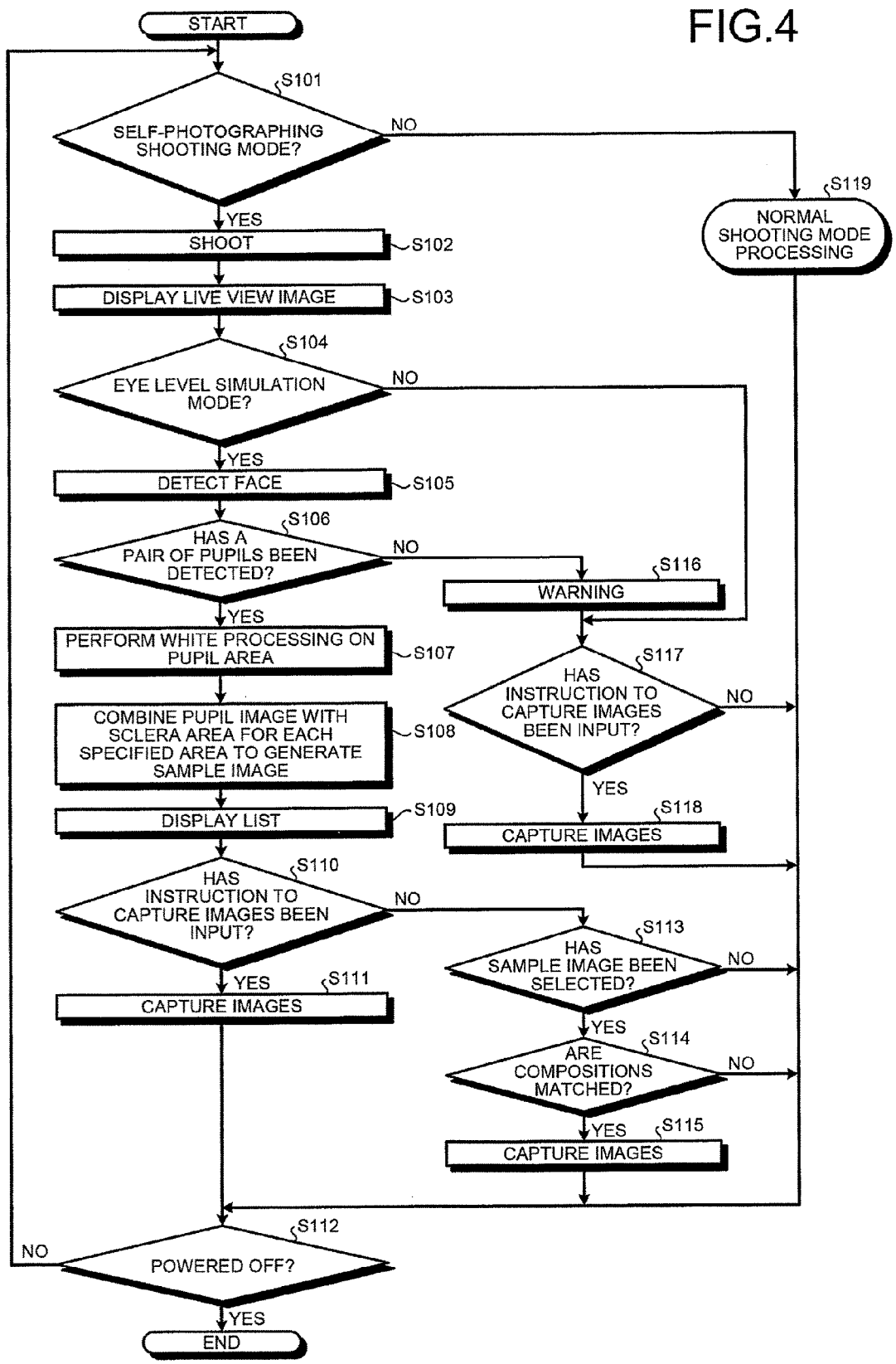
FIG. 4 is a flowchart illustrating an outline of processing executed by the imaging device according to the first embodiment of the present invention.

Processing executed by the imaging device 1 having the above configuration will be described. FIG. 4 is a flowchart describing an outline of the processing executed by the imaging device 1.

Figure 5:
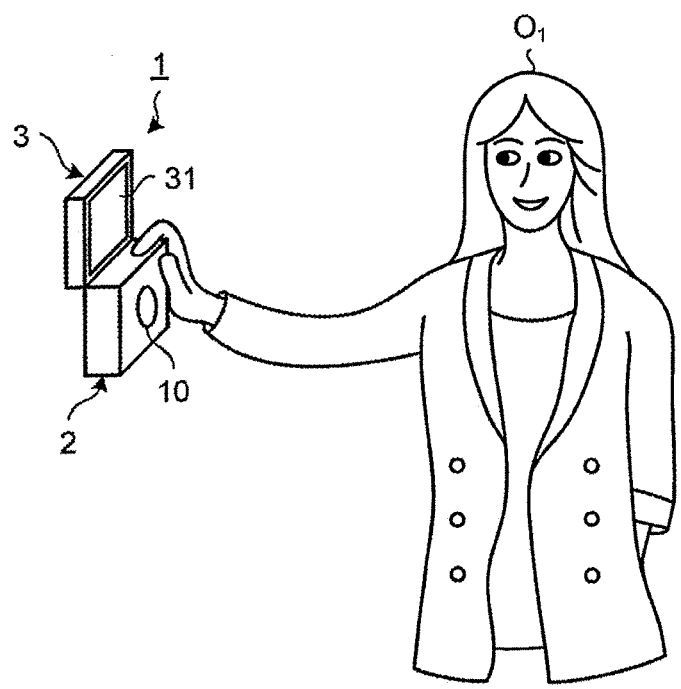
FIG. 5 is a diagram illustrating a state where the imaging device according to the first embodiment of the present invention is set to a self-photographing shooting mode.

As illustrated in FIG. 4, first, the control unit 15 determines whether the imaging device 1 is set to a self-photographing shooting mode (step S101). To be specific, the control unit 15 determines whether the display area of the display unit 31 is directed to the front surface side (a visual field side of the imaging unit 10), with respect to the main body 2, based on a determination result input from the revolving determination unit 14. For example, as illustrated in FIG. 5, when the display area of the display unit 31 is directed to the front surface side by an object $O_1$, the control unit 15 determines that the imaging device 1 is set to the self-photographing shooting mode. When the control unit 15 has determined that the imaging device 1 is set to the self-photographing shooting mode (Yes in step S101), the imaging device 1 proceeds to step S102. In contrast, when the control unit 15 has determined that the imaging device 1 is not set to the self-photographing shooting mode (No in step S101), the imaging device 1 proceeds to step S119 described below.

In step S102, the imaging controller 155 causes the imaging unit 10 to shoot. To be specific, as illustrated in FIG. 5, the imaging controller 155 causes the imaging unit 10 to shoot the object $O_1$ as an object.

Following that, the display controller 156 displays, on the display unit 31, a live view image corresponding to the image data generated by the imaging unit 10 (step S103). In this case, the display controller 156 inverts the live view image corresponding to the image data generated by the imaging unit 10 with respect to the main body 2, and displays the inverted live view image on the display unit 31 (mirror-inverted display).

Then, when an eye level simulation mode, which can be intuitively recognized by the photographer, is set to the imaging device 1 with respect to the objet (object $O_1$), as the advice on imaging related to an expression of when the self-photographing shooting is performed (Yes in step S104), the face detection unit 151 detects the face of the object in the image corresponding to the image data generated by the imaging unit 10 (step S105).

Following that, when the pupil detection unit 152 has detected a pair of pupils from the face detected by the face detection unit 151 (Yes in step S106), the pupil-changed image generation unit 153 performs white processing of superimposing or filling white (or may be a color close to the detected white of the eyes (the sclera area), hereinafter, simplified as white) in the pupil area (an area including pupils, irises, and corneas) of the face of the object detected by the pupil detection unit 152 and the sclera area (an area of white of the eyes) (step S107), and combines a pupil image with the sclera area for each specified area to generate a sample image in which the line of sight of the object has been changed (step S108).

Figure 6:
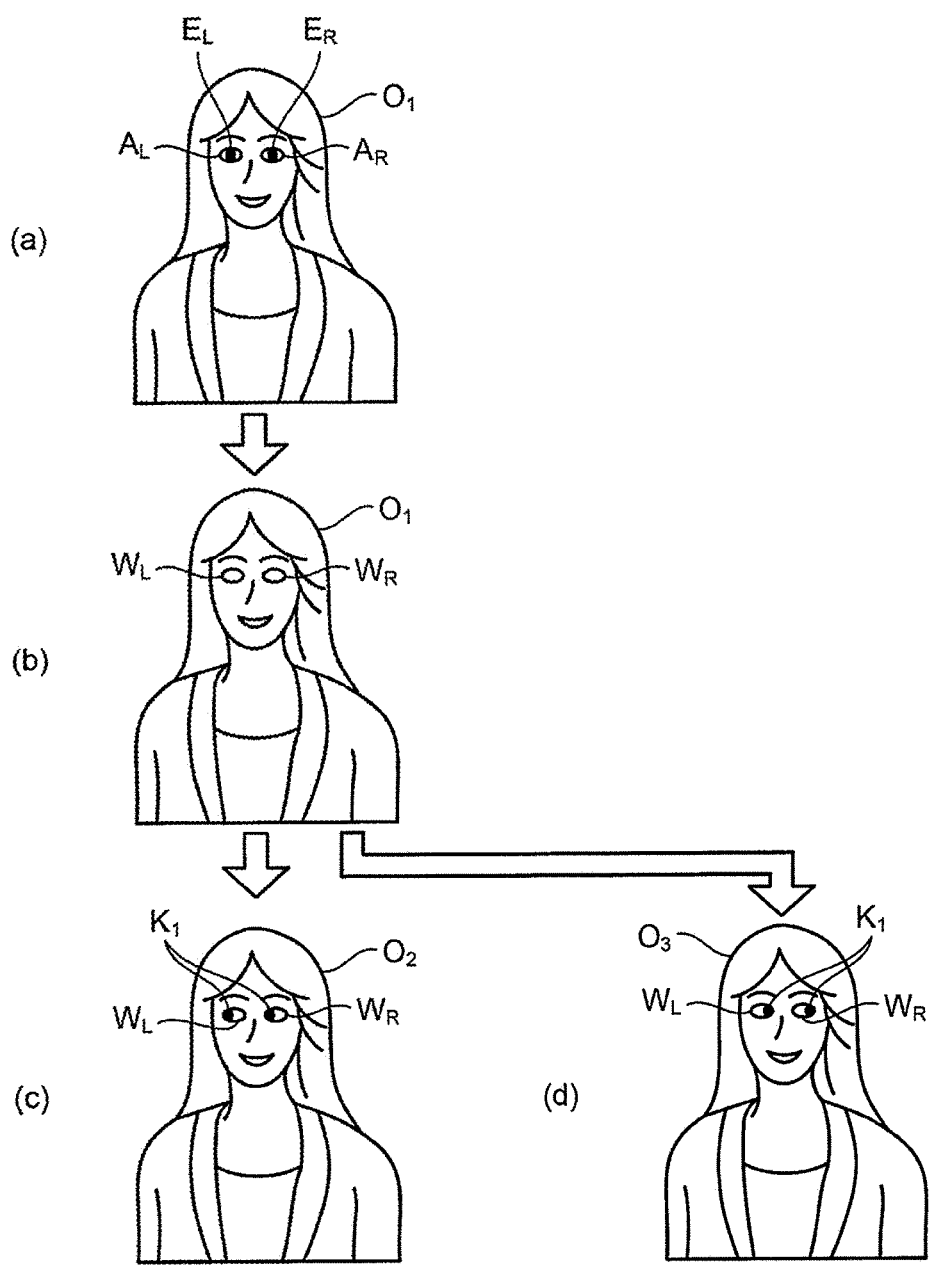
FIG. 6 is a diagram schematically illustrating an outline of a method of generating a sample image of an object generated by a pupil-changed image generation unit of the imaging device according to the first embodiment of the present invention.

FIG. 6 is a diagram schematically illustrating an outline of a method of generating the sample image of the object generated by the pupil-changed image generation unit 153.

As illustrated in FIG. 6, first, the pupil-changed image generation unit 153 executes the white processing of filling white in a pupil area ($E_L$, $E_R$) in a pair of eye areas $A_L$ and $A_R$ of the face of the object $O_1$ detected by the pupil detection unit 152 (FIG. 6:(a)→(b)). Following that, the pupil-changed image generation unit 153 generates a sample image $O_2$ and a sample image $O_3$ of the object in which pupil images $K_1$ are combined with sclera areas $W_L$ and $W_R$ of the object $O_1$ for each of specified areas, such as right and left end portions (inner corners of the eyes and outer corners of the eyes) of the object (FIG. 6:(b)→(c), and FIG. 6:(b)→(d)). Note that, in FIG. 6, the pupil-changed image generation unit 153 may generate the sample images having changed lines of sight of the object in which the pupil images $K_1$ are combined with upper and lower end portions or oblique end portions, other than the right and left end portions of the eyes of the object.

Figure 7:
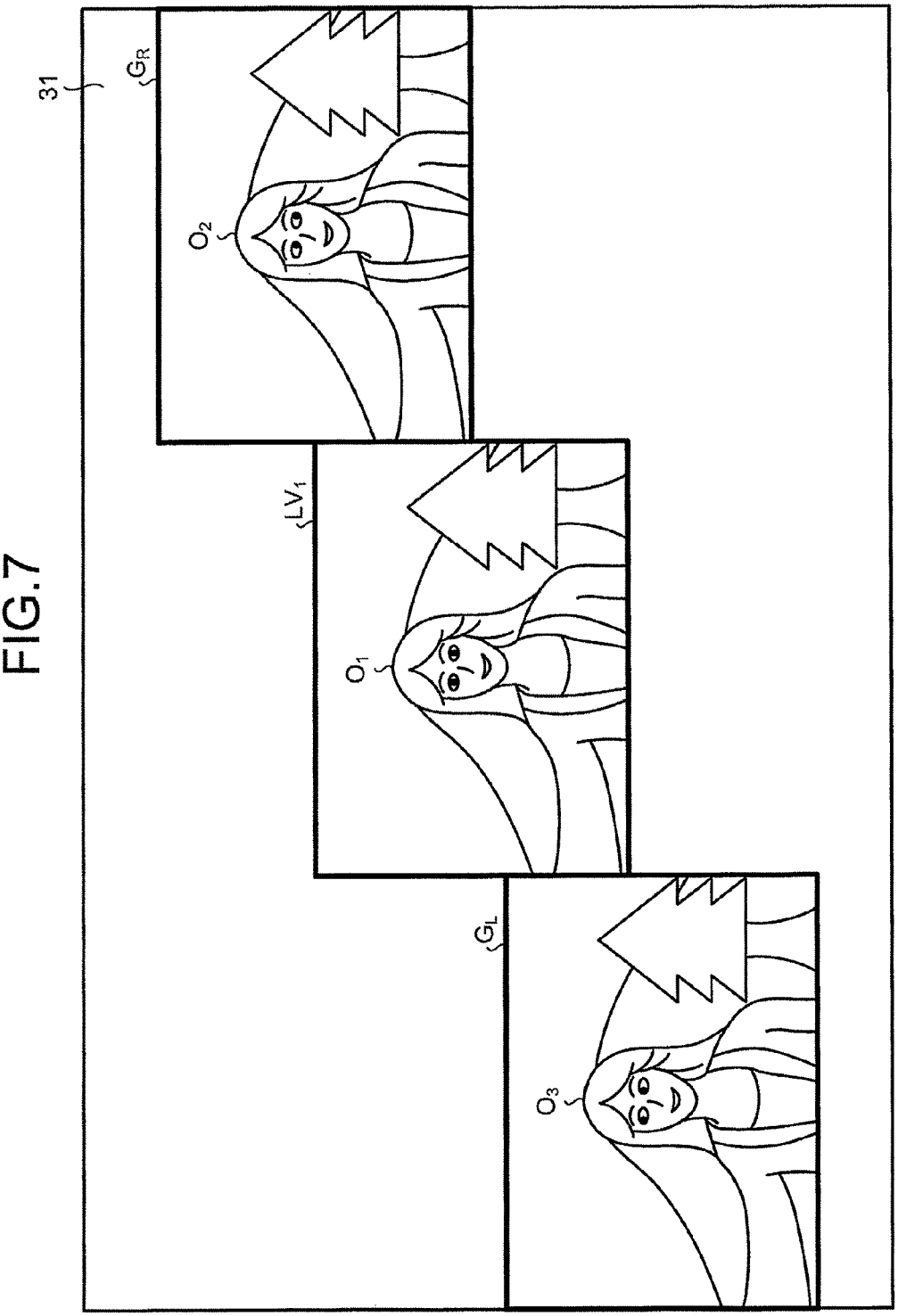
FIG. 7 is a diagram illustrating an example of an image displayed in a display unit of the imaging device according to the first embodiment of the present invention.

In step S109, the display controller 156 displays, on the display unit 31, a list of the sample images generated by the pupil-changed image generation unit 153 and the live view image. To be specific, as illustrated in FIG. 7, the display controller 156 displays, on the display unit 31, a list of a live view image $LV_1$ corresponding to the image data generated by the imaging unit 10 and a sample image $G_L$ and a sample image $G_R$ generated by the pupil-changed image generation unit 153. In this case, the display controller 156 reduces the sizes of the live view image $LV_1$, the sample image $G_L$, and the sample image $G_R$, and displays a list of the reduced images on the display unit 31. Further, the display controller 156 arranges the sample image $G_L$ and the sample image $G_R$ in the directions of the lines of sight to which the sample image $G_L$ and the sample image $G_R$ are directed, and displays the sample images on the display unit 31.

Accordingly, the object $O_1$ can virtually recognize an own expression to be captured when shifting the line of sight to the display unit 31 or the imaging unit 10, by confirming an image displayed on the display unit 31 at the time of the self-photographing shooting. As a result, even when performing the self-photographing shooting, the photographer can capture a natural expression. Further, when performing the self-photographing shooting, the photographer can virtually recognize a state of turning his/her head sideways, or a state of shifting the line of sight, confirming the screen.

Further, the display controller 156 displays the list of the sample image $G_L$ and the sample image $G_R$ on the display unit 31, whereby the user (photographer) can determine which direction of the eyes is suitable for the scene of the time at first sight, and can easily compare the sample images and determine which is favorable. Apparently, the sample images may be sequentially displayed instead of the list. In this case, the display controller 156 does not need to divide the screen, and the user can confirm the sample images in a large screen. When the user wants to have images displayed in the list so that he/she can make a comparison, and he/she wants to see a difference of the expressions in a large manner, there is a method of cutting only portions of the faces and arranging the portions. Such an application apparently falls within the scope covered by the present patent application. Further, it is favorable if a background can be seen so that a composition can be confirmed at the same time. Therefore, the imaging device 1 may perform expression simulation after the composition is confirmed. Apparently, a best image of the direction of eyes may sometimes be able to be selected in view of the background and the expression. In this case, the display controller 156 may have a specification of displaying a single recommended image (an advice image) that prompts the user to capture an image with the recommended image, without displaying a plurality of images on the display unit 31. The display controller 156 may not only automatically change the direction of eyes, but also move the eyes (black of the eyes) to look at the direction when a touch panel is slid, or when a specific switch is operated. Imaging devices of the past cameras only can confirm images staring at the panel. Therefore, an expression that does not stare at the panel (display unit 31) being able to be changed and confirmed depending on operations of the photographer enables unprecedented "self-photographing shooting", and exhibits a remarkable effect in capturing images. That is, the image staring at the panel is converted into an image having another eye level, which leads to finding of an attractive expression that has not been noticed before.

Following that, when a release signal that instructs to capture images has been input from the input unit 11 (Yes in step S110), the imaging device 1 captures images (step S111).

Then, when the power supply of the imaging device 1 has been turned OFF (Yes in step S112), the imaging device 1 terminates the present processing. In contrast, when the power supply of the imaging device 1 is not turned OFF (No in step S112), the imaging device 1 is returned to step S101.

In step S110, when the release signal that instructs to capture images has not been input from the input unit 11 (No in step S110), the imaging device 1 proceeds to step S113.

Following that, when one of a plurality of sample images displayed in the list on the display unit 31 has been selected through the input unit 11 (Yes in step S113), and the composition determination unit 154 has determined that the composition of the object of the live view image corresponding to the image data generated by the imaging unit 10 and the composition of the object of the sample image selected by the input unit 11 are matched (Yes in step S114), the imaging controller 155 causes the imaging unit 10 to capture images (step S115). Accordingly, an expression desired by the object $O_1$ can be captured, and a natural expression can be captured. After step S115, the imaging device 1 proceeds to step S112.

In step S113, when any of the plurality of sample images in the list displayed on the display unit 31 has not been selected through the input unit 11 (No in step S113), the imaging device 1 proceeds to step S112.

In step S114, when the composition determination unit 154 has determined that the composition of the object of the live view image corresponding to the image data generated by the imaging unit 10 and the composition of the object of the sample image selected by the input unit 11 are not matched (No in step S114), the imaging device 1 proceeds to step S112.

In step S106, when the pupil detection unit 152 has not detected a pair of pupils from the face detected by the face detection unit 151 (No in step S106), the display controller 156 superimposes warning on the live view image and displays the superimposed image on the display unit 31 (step S116).

Following that, when the release signal that instructs to capture images has been input from the input unit 11 (Yes in step S117), the imaging device 1 captures images (step S118). After step S118, the imaging device 1 proceeds to step S112. In contrast, when the release signal that instructs to capture images has not input from the input unit 11 (No in step S117), the imaging device 1 proceeds to step S112.

In step S104, the eye level simulation mode is not set to the imaging device 1 (No in step S104), the imaging device 1 proceeds to step S117.

In step S119, when the display unit 31 displays the live view image corresponding to the image data generated by the imaging unit 10, the imaging device 1 executes normal shooting mode processing of capturing images when the release signal that instructs to capture images is input from the input unit 11. After step S119, the imaging device 1 proceeds to step S112.

According to the first embodiment of the present invention, the display controller 156 displays, on the display unit 31, a plurality of sample images in which the lines of sight of the object have been changed, whereby the photographer can virtually recognize an own expression to be captured while confirming the expression in the panel even if performing the self-photographing shooting.

Further, according to the first embodiment of the present invention, the imaging controller 155 captures an image according to a determination result of the composition determination unit 154, whereby the photographer can capture a desired expression, and can obtain an image of a natural expression.

Note that, in the first embodiment of the present invention, a case in which the imaging device 1 is set to the self-photographing shooting mode has been described. However, the imaging device 1 can be applied to a normal shooting mode, for example. In this case, the photographer can take a picture of the object with an expression that is not intended by the photographer by giving advice on display to the object while confirming the plurality of sample images displayed on the display unit 31.

Further, while, in the first embodiment of the present invention, the description has been given using a single person, if this technology is applied to two persons, the imaging device 1 that prompts shooting of a drama produced with crossing of eye levels of the two persons can be obtained. Further, a guide device that prompts the two persons to look at each other, apart from the imaging device 1, can be provided.

Second Embodiment

Next, a second embodiment of the present invention will be described. An imaging device according to the second embodiment has a configuration different from the above-described imaging device 1 according to the first embodiment, and processing to be executed is different. To be specific, while, in the above-described imaging device according to the first embodiment, only the positions of the pupils of the object are changed, in the imaging device according to the second embodiment, positions of parts of a face of an object are changed. Therefore, hereinafter, a configuration of the imaging device according to the second embodiment will be described first, and then processing executed by the imaging device according to the second embodiment will be described. Note that the same configurations as the imaging device 1 according to the first embodiment are denoted with the same reference signs, and description is omitted.

Figure 8:
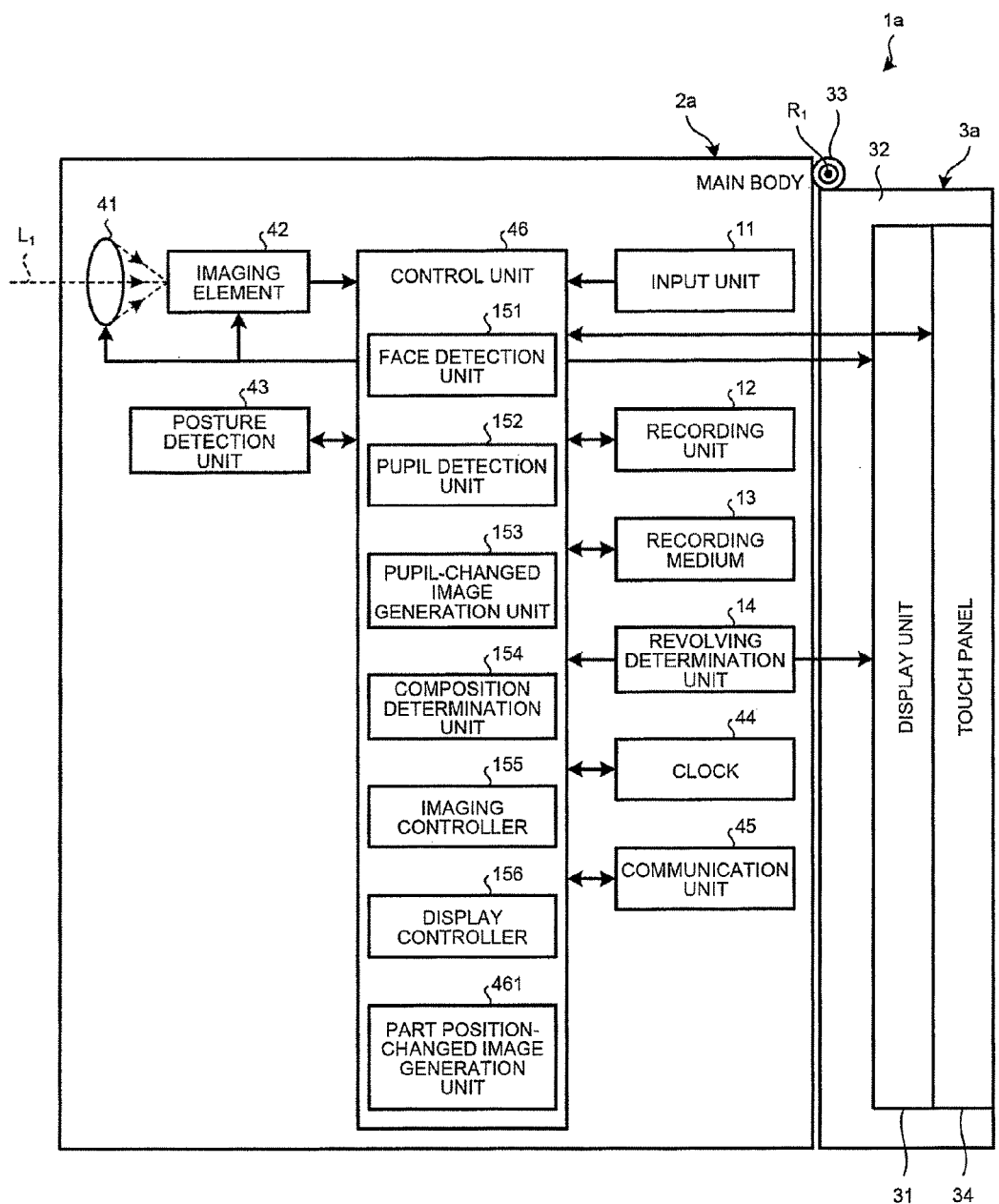
FIG. 8 is a block diagram illustrating a functional configuration of an imaging device according to a second embodiment of the present invention.

FIG. 8 is a block diagram illustrating a functional configuration of an imaging device according to the second embodiment. An imaging device 1a illustrated in FIG. 8 includes a main body 2a that images an object and generates image data of the object, and a display mechanism 3a revolvably provided to the main body 2a from a photographer side to an object side, and capable of displaying an image corresponding to the image data generated by the main body 2a.

First, a configuration of the main body 2a will be described. The main body 2a includes an input unit 11, a recording unit 12, a recording medium 13, a revolving determination unit 14, a lens unit 41, an imaging element 42, a posture detection unit 43, a clock 44, a communication unit 45, and a control unit 46.

The lens unit 41 collects light from a specified visual field and focuses an object image on an imaging surface of the imaging element 42. The lens unit 41 is configured from a zoom lens movable along an optical axis $L_1$, a focus lens diaphragm, a shutter, and the like.

The imaging element 42 receives the object image focused by the lens unit 41 and performs photoelectric conversion, thereby to generate image data. The imaging element 42 is configured from a CCD or CMOS, a signal processing unit, an A/D converter, and the like. Note that, in the second embodiment, the lens unit 41 and the imaging element 42 function as an imaging unit.

The posture detection unit 43 is configured from an acceleration sensor and a gyro sensor, and detects acceleration and an angular speed caused in the imaging device 1a, and outputs detection results to the control unit 46.

The clock 44 has a timing function and a determination function of capturing date and time. The clock 44 outputs date and time data to the control unit 46 to add the date and time data to the image data imaged by the imaging element 42.

The communication unit 45 performs wireless communication with an external device and transmits/receives an image file including the image data according to specified wireless communication standards. Here, the specified wireless communication standards are IEEE802.11b, IEEE802.11n, and the like. Note that, in the second embodiment, any wireless communication standard is applicable. Further, the communication unit 45 is configured from a communication device for bidirectionally performing communication of various types of information such as the image file and content data with an external device through a network. The communication device is configured from an antenna that transmits/receives radio wave signals to/from the external device, a transmission/reception circuit that performs demodulation processing of a signal received by the antenna and performs modulation processing of a signal to be transmitted, and the like. Further, the communication unit 45 periodically transmits a communication signal including identification information (a device ID) that notifies its existence at the time of startup of the imaging device 1a. Note that the communication unit 45 may be provided in a recording medium such as a memory card mounted from an outside of the imaging device 1a. Further, the communication unit 45 may be provided in an accessory attached to the imaging device 1a through a hot shoe.

The control unit 46 transfers instructions and data corresponding to respective units that configure the imaging device 1a to comprehensively control an operation of the imaging device 1a. The control unit 46 is configured from a CPU, and the like.

Here, a detailed configuration of the control unit 46 will be described. The control unit 46 includes a face detection unit 151, a pupil detection unit 152, a pupil-changed image generation unit 153, a composition determination unit 154, an imaging controller 155, a display controller 156, and a part position-changed image generation unit 461.

The part position-changed image generation unit 461 generates part-changed image data of an object in which parts that configure a face detected by the face detection unit 151 have been moved in an arranging direction of a pupil area in a sclera area changed by the pupil-changed image generation unit 153.

Next, a configuration of the display mechanism 3a will be described. The display mechanism 3a includes a display unit 31, a movable unit 32, a revolving support unit 33, and a touch panel 34.

The touch panel 34 is provided by being superimposed on a display screen of the display unit 31. The touch panel 34 detects touching of a substance from an outside, and outputs a position signal according to a detected touched position to the control unit 46. Further, the touch panel 34 detects a position touched by a user based on information displayed on the display unit 31, for example, an icon image or a thumbnail image, and receives an input of an instruction signal that instructs an operation to be performed by the imaging device 1a according to the detected touched position. Typically, as the touch panel 34, there are a resistive film-type touch panel, an electrostatic capacity type touch panel, an optical type touch panel, and the like. In the second embodiment, any type touch panel is applicable. Further, the display unit 31, the movable unit 32, and the touch panel 34 may be integrally formed.

Figure 9:
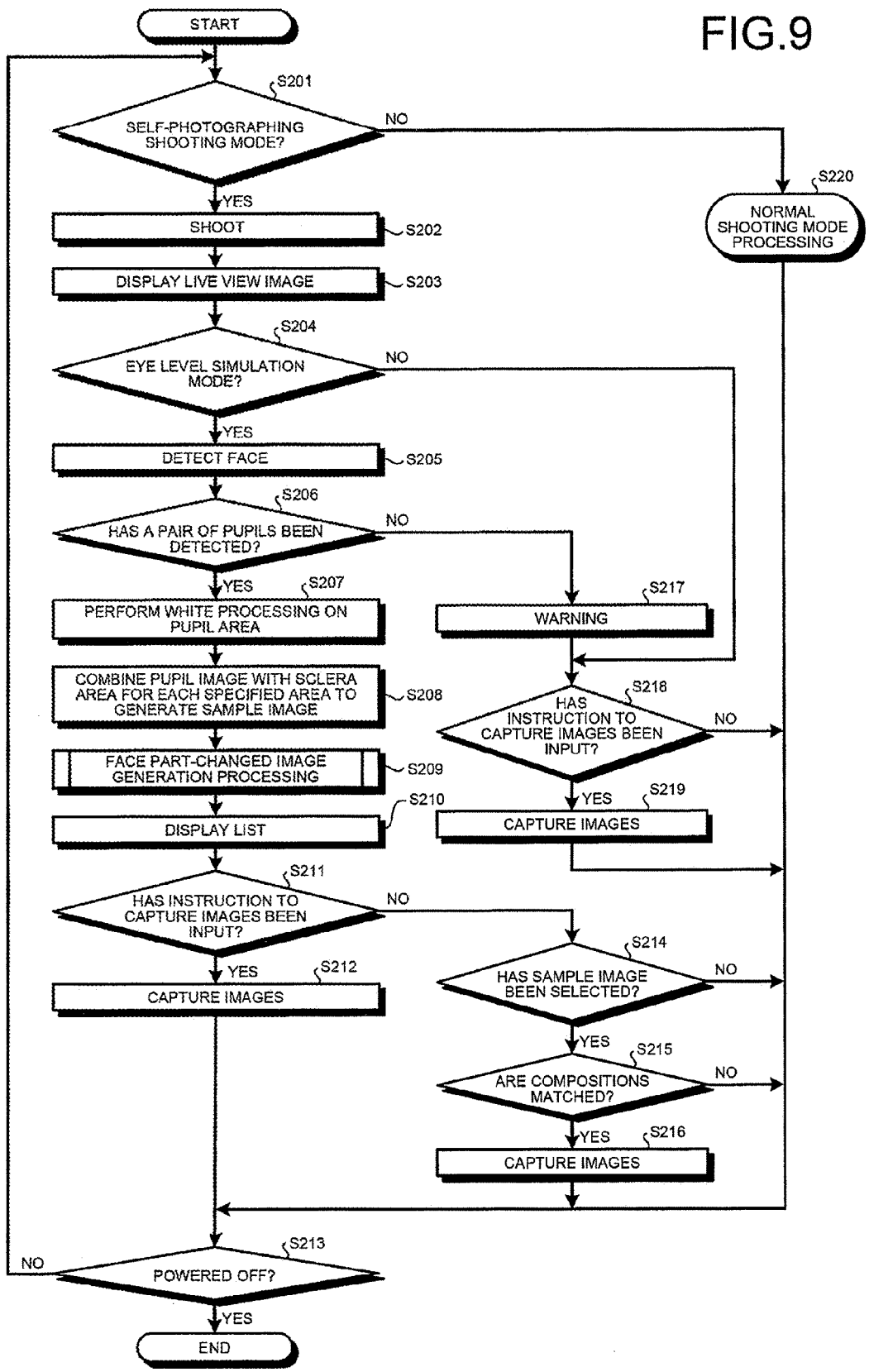
FIG. 9 is a flowchart illustrating an outline of processing executed by the imaging device according to the second embodiment of the present invention.

Processing executed by the imaging device 1a having the above configuration will be described. FIG. 9 is a flowchart illustrating an outline of the processing executed by the imaging device 1a.

Steps S201 to S208 respectively correspond to steps S101 to S108 of FIG. 4 described above.

In step S209, the part position-changed image generation unit 461 executes face part-changed image generation processing of generating a plurality of sample images in which parts (characteristic points) of the face of the object have been changed (step S209).

Figure 10:
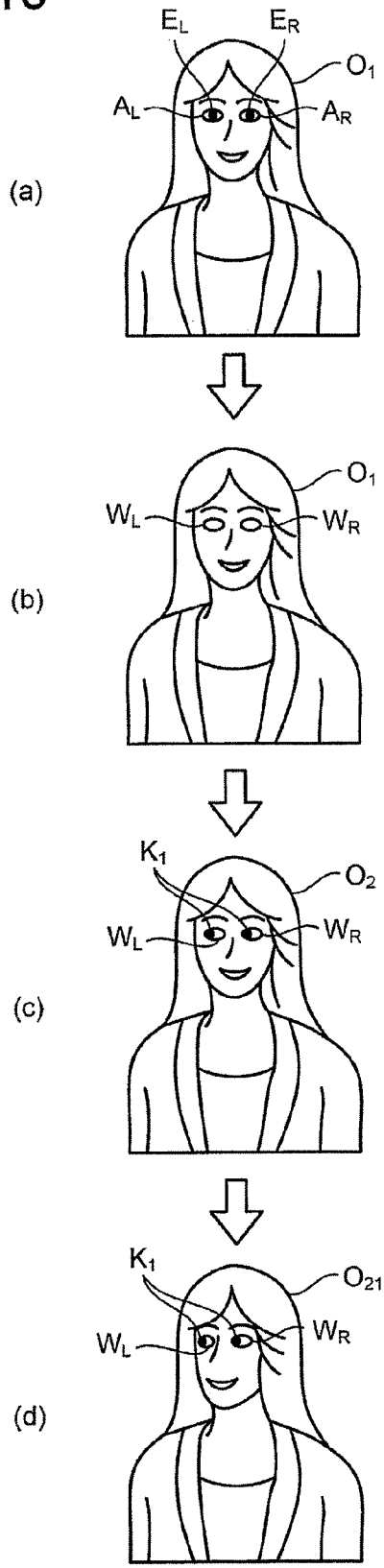
FIG. 10 is a diagram schematically describing an outline of a method of generating a sample image generated by a part position-changed image generation unit of the imaging device according to the second embodiment of the present invention.

FIG. 10 is a diagram schematically describing an outline of a method of generating the sample image generated by the part position-changed image generation unit 461. As illustrated in FIG. 10, the part position-changed image generation unit 461 changes, with respect to the image of the object in which the positions of the pupils have been changed by the pupil-changed image generation unit 153 (FIG. 10:(a)→(b)→(c)), positions of parts of the face, based on the direction into which the pupils are directed (FIG. 10:(d)). To be specific, as illustrated in (d) of FIG. 10, when the pupils of the object face in the left direction (see FIG. 10:(c)), the part position-changed image generation unit 461 generates a similar sample image $O_{21}$ in which the positions of the parts of the face are moved in the left direction (FIG. 10:(d)).

Figure 11:
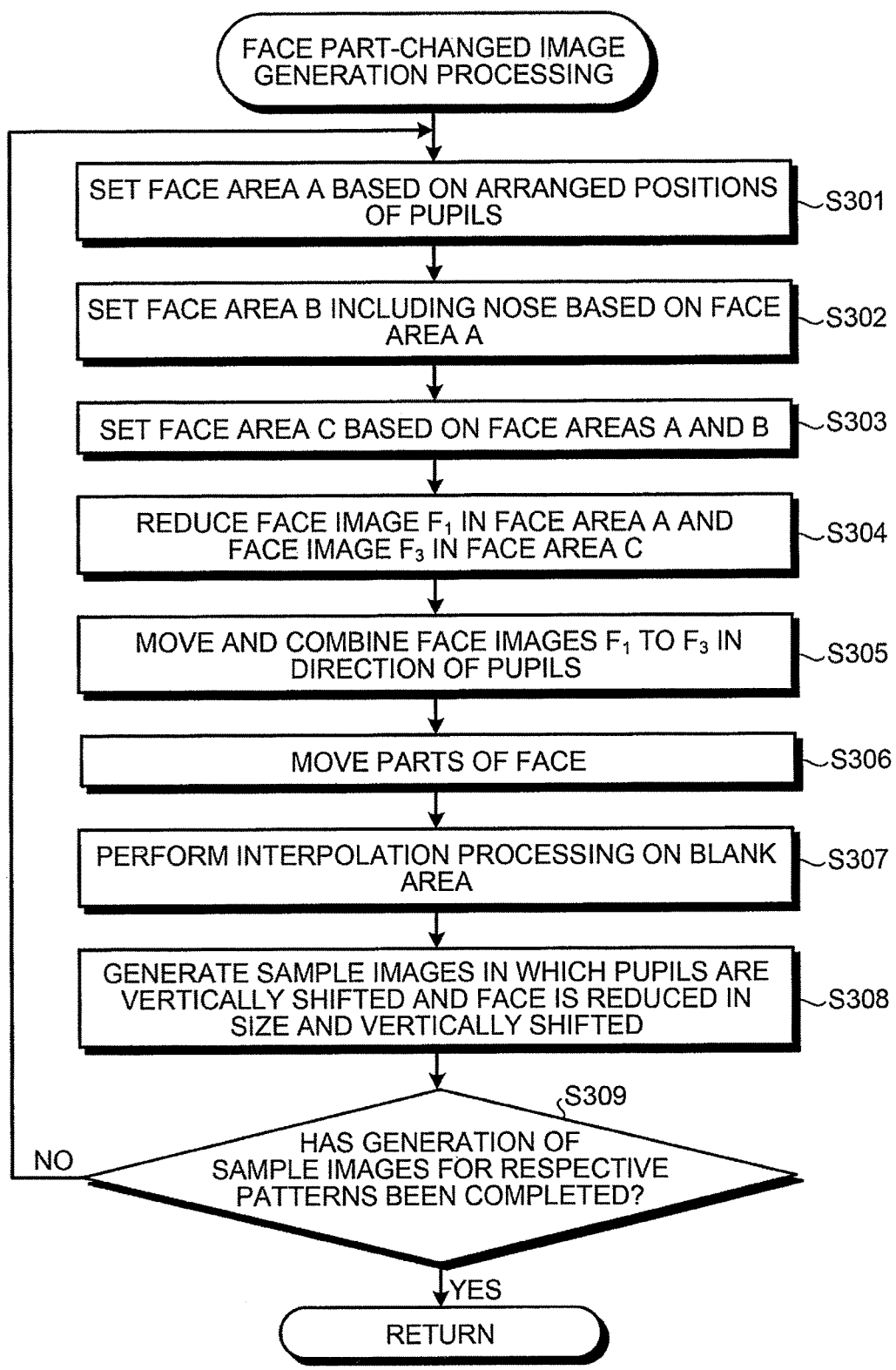
FIG. 11 is a flowchart illustrating an outline of face part-changed image generation processing of FIG. 9.
Figure 12:
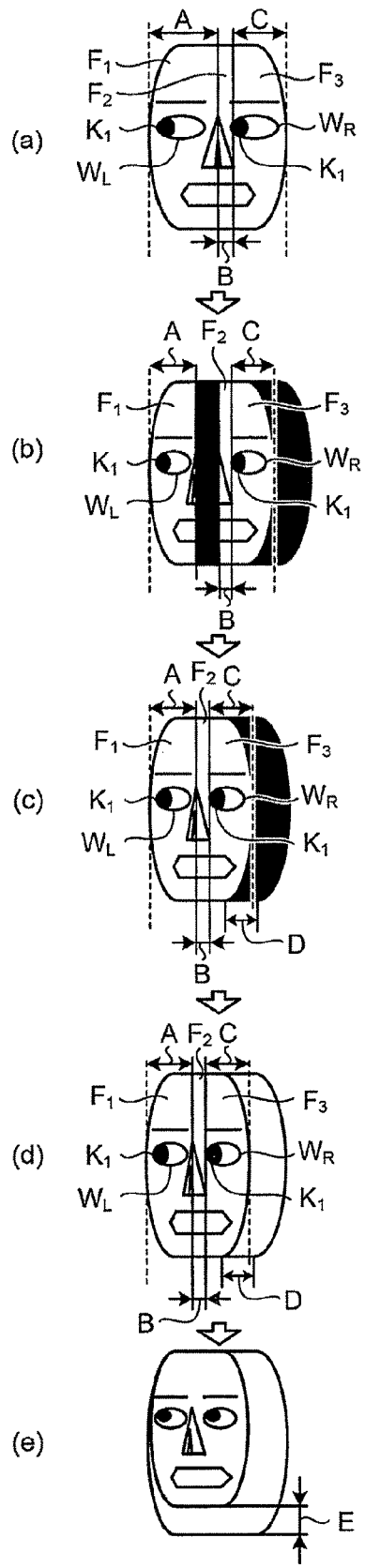
FIG. 12 is a diagram for describing a method of generating a sample image generated by the part position-changed image generation unit of the imaging device according to the second embodiment of the present invention.

Here, the face part-changed image generation processing of step S209 of FIG. 9 will be described in detail. FIG. 11 is a flowchart illustrating an outline of the face part-changed image generation processing. FIG. 12 is a diagram for describing a method of generating the sample image generated by the part position-changed image generation unit 461.

As illustrated in FIG. 11, first, the part position-changed image generation unit 461 sets a face area "A" based on arranged positions of the pupils of the object changed by the pupil-changed image generation unit 153 (step S301).

Following that, the part position-changed image generation unit 461 sets a face area "B" including a nose of the object based on the face area "A" (step S302), and sets a face area "C" based on the face areas "A" and "B" (step S303). To be specific, as illustrated in (a) of FIG. 12, the part position-changed image generation unit 461 sets the face areas "A", "B", and "C" to the area of the face of the object.

Following that, the part position-changed image generation unit 461 reduces a face image in the face area "A" and a face image in the face area "C" into a direction of the arranged positions of the pupils of the object changed by the pupil-changed image generation unit 153 (step S304). To be specific, as illustrated in (b) of FIG. 12, the part position-changed image generation unit 461 reduces a face image $F_1$ in the face area "A" and a face image $F_3$ in the face area "C" into a direction of arranged positions of pupil images $K_1$ of the object changed by the pupil-changed image generation unit 153, for example, the left direction.

Following that the part position-changed image generation unit 461 moves and combines the face image $F_1$, a face image $F_2$, and the face image $F_3$ in the direction of the arranged positions of the pupil images $K_1$ of the object changed by the pupil-changed image generation unit 153 (step S305). To be specific, as illustrated in (c) of FIG. 12, the part position-changed image generation unit 461 moves and combines the face images $F_1$, $F_2$, and $F_3$ into the direction (left side) of the arranged positions of the pupil images $K_1$ of the object changed by the pupil-changed image generation unit 153 (FIG. 12:(b)→(c)).

Following that, the part position-changed image generation unit 461 moves the parts of the face of the object into the direction of the arranged position of the pupil image of the object changed by the pupil-changed image generation unit 153 (step S306).

Figure 13:
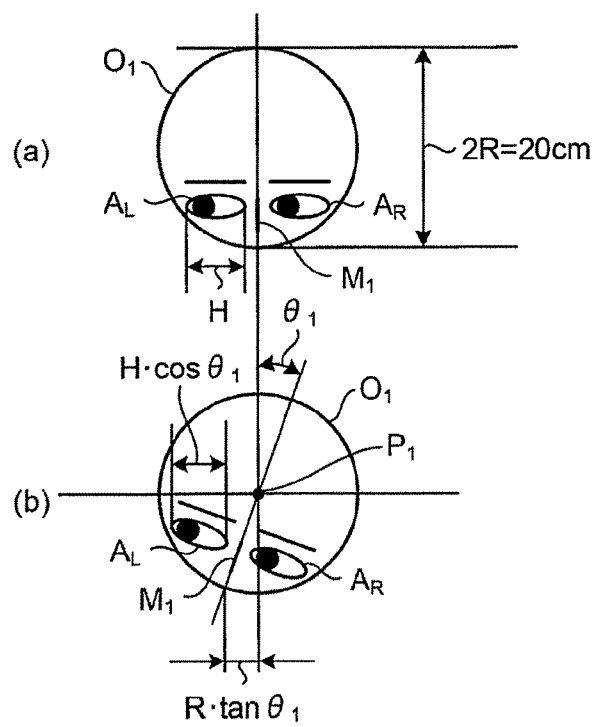
FIG. 13 is a diagram for schematically describing an outline of a method of moving parts of a face of an object by the part position-changed image generation unit of the imaging device according to the second embodiment of the present invention.

FIG. 13 is a diagram for schematically describing an outline of a method of moving the parts of the face of the object by the part position-changed image generation unit 461.

As illustrated in (a) of FIG. 13, when a neck is turned by a specified angle $\theta_1$ from a state where the object faces the front where a head portion of the object $O_1$ is a sphere having a radius R, a position of a nose $M_1$ can be expressed by R·tan $\theta_1$. Further, a length of each part of the face in the lateral direction can also be expressed based on the angle $\theta_1$. To be specific, the length of each part can be expressed by H·cos $\theta_1$ where widths of eye areas $A_L$ and $A_R$ of the object $O_1$ are H. Therefore, the part position-changed image generation unit 461 multiplies each principal part of the face by cos $\theta_1$, and then moves the principal part from a center $P_1$ of the object $O_1$ by R·tan $\theta_1$, thereby to generate an image in which the object $O_1$ faces sideways.

Figure 14:
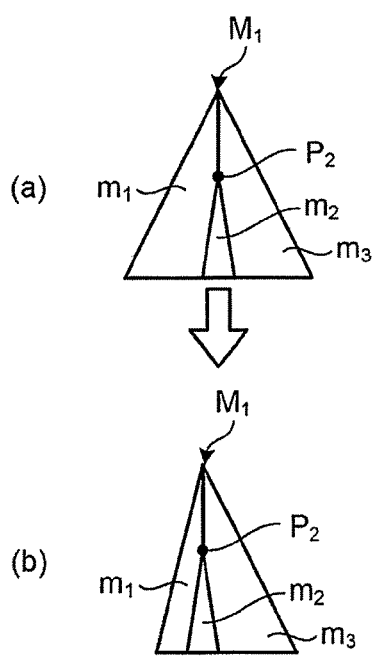
FIG. 14 is a diagram for schematically describing an outline of a method of moving a nose of the object by the part-position-changed image generation unit of the imaging device according to the second embodiment of the present invention.

By the way, as illustrated in (a) of FIG. 14, the area of the nose $M_1$ of the object has a large stereoscopic effect, and an area $m_1$ of a ridgeline (shading) of the nose in the inclined direction becomes difficult to be seen, and thus it is necessary to make an area $m_3$ of a side surface at an opposite side to the inclined direction be displayed in a large manner, rather than to multiply the part by cos $\theta_1$ times. Therefore, as illustrated in (b) of FIG. 14, the part position-changed image generation unit 461 divides the portion of the nose at a top $P_2$ of a protrusion, and reduces the size of only the area m1 that is an inclined area, among the areas m1 to m3. Accordingly, the part position-changed image generation unit 461 can generate a natural sample image in which the object looks sideways. Here, an example has been described. However, a method of calling a database of images classified into face directions with part position information, and attaching an actually captured image to a called image can also be considered.

In step S307, the part position-changed image generation unit 461 executes interpolation processing of interpolating pixels in a blank area based on information of surrounding pixels. To be specific, as illustrated in (d) of FIG. 12, the part position-changed image generation unit 461 performs the interpolation processing of interpolating other pixels in the blank area D (FIG. 12:(c)→ (d)). Note that, in FIG. 12, a state in which the object $O_1$ does not wear an accessory, such as a pair of glasses, has been described. However, even if the object $O_1$ wears an accessory, the present invention can be applied. In this case, the part position-changed image generation unit 461 similarly generates an accessory image of when the object $O_1$ looks sideways by multiplying the accessory, for example, a pair of glasses, by cos $\theta_1$ times, and then moving the accessory from the center $P_1$ of the object $O_1$ by R·tan $\theta_1$, and superimposes the accessory image on the sample image. At this time, when pixels are not sufficient in the area of the accessory, the part position-changed image generation unit 461 may just interpolate the pixels of a color of a largest ratio in another area or in the area of the accessory.

Following that, the part position-changed image generation unit 461 vertically shifts the pupils, and reduces the size of the face, and generates a vertically-shifted sample image (step S308). For example, as illustrated in (e) of FIG. 12, the part position-changed image generation unit 461 shifts the pupil image upward in the sclera area $W_L$, and generates a sample image in which the size of the face is reduced in the arranging direction of the pupil image (a sample image reduced in the longitudinal direction by a distance E). Similarly, the part position-changed image generation unit 461 shifts the pupil image downward in the sclera area $W_L$, and generates a sample image in which the size of the face is reduced in the arranging direction of the pupil image.

Following that, when the generation of the sample images of respective patterns by the part position-changed image generation unit 461 has been completed (Yes in step S309), the imaging device 1a is returned to the main routine of FIG. 9. In contrast, when the generation of the sample images of respective patterns by the part position-changed image generation unit 461 has not been completed (No in step S309), the imaging device 1a is returned to step S301.

Figure 15:
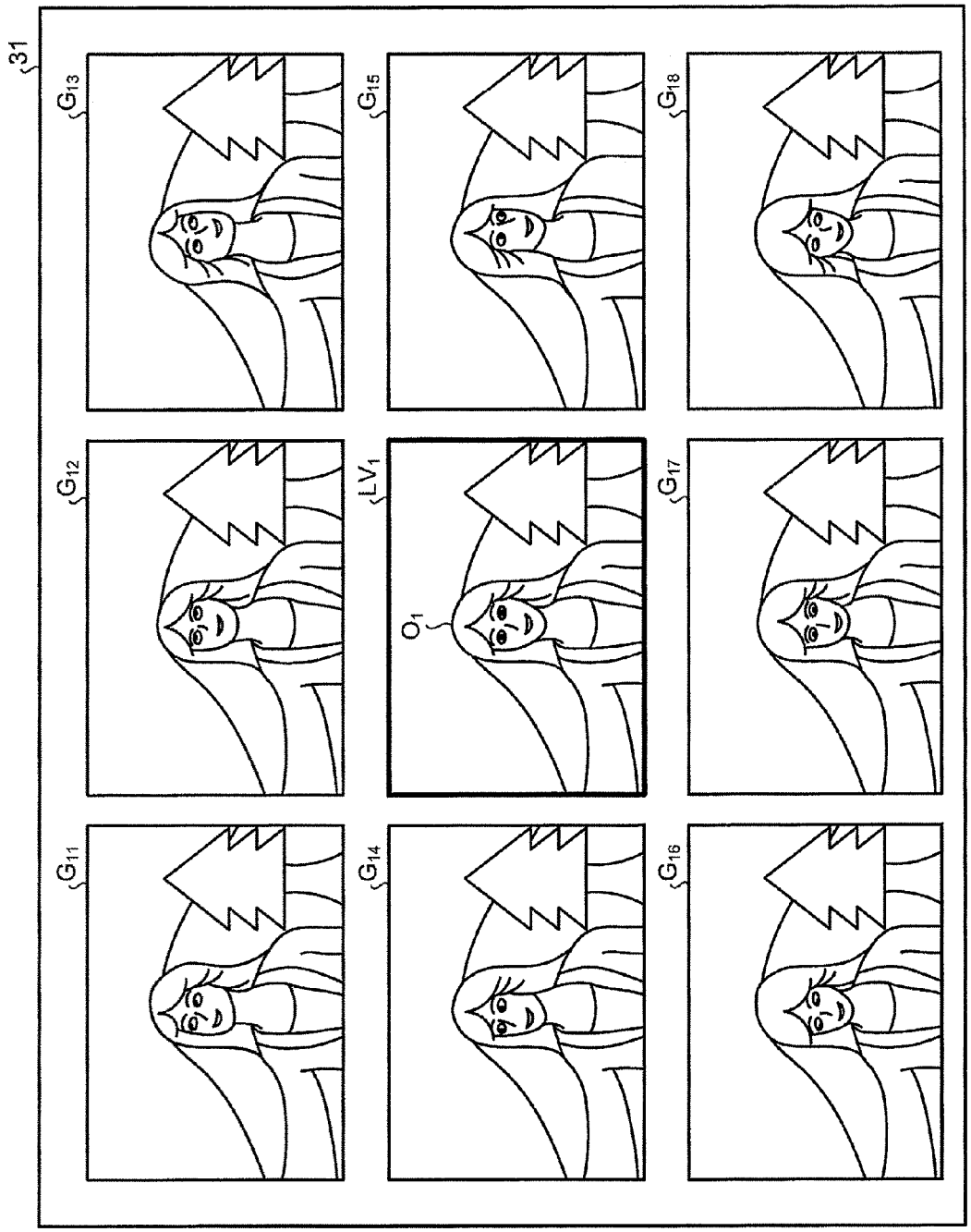
FIG. 15 is a diagram illustrating an example of images displayed in a display unit of the imaging device according to the second embodiment of the present invention.

Referring back to FIG. 9, description of step S210 and subsequent steps will be described. In step S210, the display controller 156 displays, on the display unit 31, a list of a plurality of sample images generated by the part position-changed image generation unit 461, in which the positions of the faces and the parts of the objects have been changed. To be specific, as illustrated in FIG. 15, the display controller 156 displays, on the display unit 31, a plurality of sample images $G_{11}$ to $G_{18}$ generated by the part position-changed image generation unit 461, in which the positions of the faces of the objects have been changed, and the live view image $LV_1$, in the list. Accordingly, the photographer (object) can virtually recognize own expressions beyond expectation by confirming the images displayed on the display unit 31 at the time of the self-photographing shooting.

Steps S211 to S220 respectively correspond to steps S110 to S119 of FIG. 4 described above.

According to the above-described second embodiment of the present invention, the display controller 156 display, on the display unit 31, the plurality of sample images in which the lines of sight of the object have been changed, whereby the photographer can virtually recognize an own expression to be captured in the case of performing the self-photographing shooting.

Further, according to the second embodiment of the present invention, the display controller 156 displays, on the display unit 31, the sample image corresponding to the part changed-image data in which the parts of the object have been changed by the part position-changed image generation unit 461. As a result, the object can virtually recognize an own expression beyond expectation, which the photographer cannot have confirmed before because he/she looks at the display unit 31, by confirming the image displayed on the display unit 31 at the time of the self-photographing shooting.

Further, according to the second embodiment of the present invention, the imaging controller 155 captures an image according to a determination result of the composition determination unit 154, whereby the photographer can capture a desired expression, and can obtain an image of a natural expression.

Third Embodiment

Next, a third embodiment of the present invention will be described. An imaging device according to the third embodiment has a configuration different from the imaging device according to the second embodiment, and processing to be executed is different. To be specific, while the imaging device according to the second embodiment generates the sample image having an expression of the object changed by the imaging device, the imaging device according to the third embodiment receives and displays a sample image data generated by an external device through a network. Such processing on a so-called cloud enables image processing beyond processing capacities of mobile devices, and thus is suitable for being applied to complicated processing. Note that, when similar processing can be completed within a device, it is not necessary to use the network. Further, various applications and modifications can be made regarding which part the device is in charge and which part the cloud is in change. Therefore, hereinafter, a configuration of a display system according to the third embodiment will be described first, and then processing executed by the display system according to the third embodiment will be described. Note that the same configurations as the imaging device 1a according to the second embodiment are denoted with the same reference signs, and description is omitted.

Figure 16:
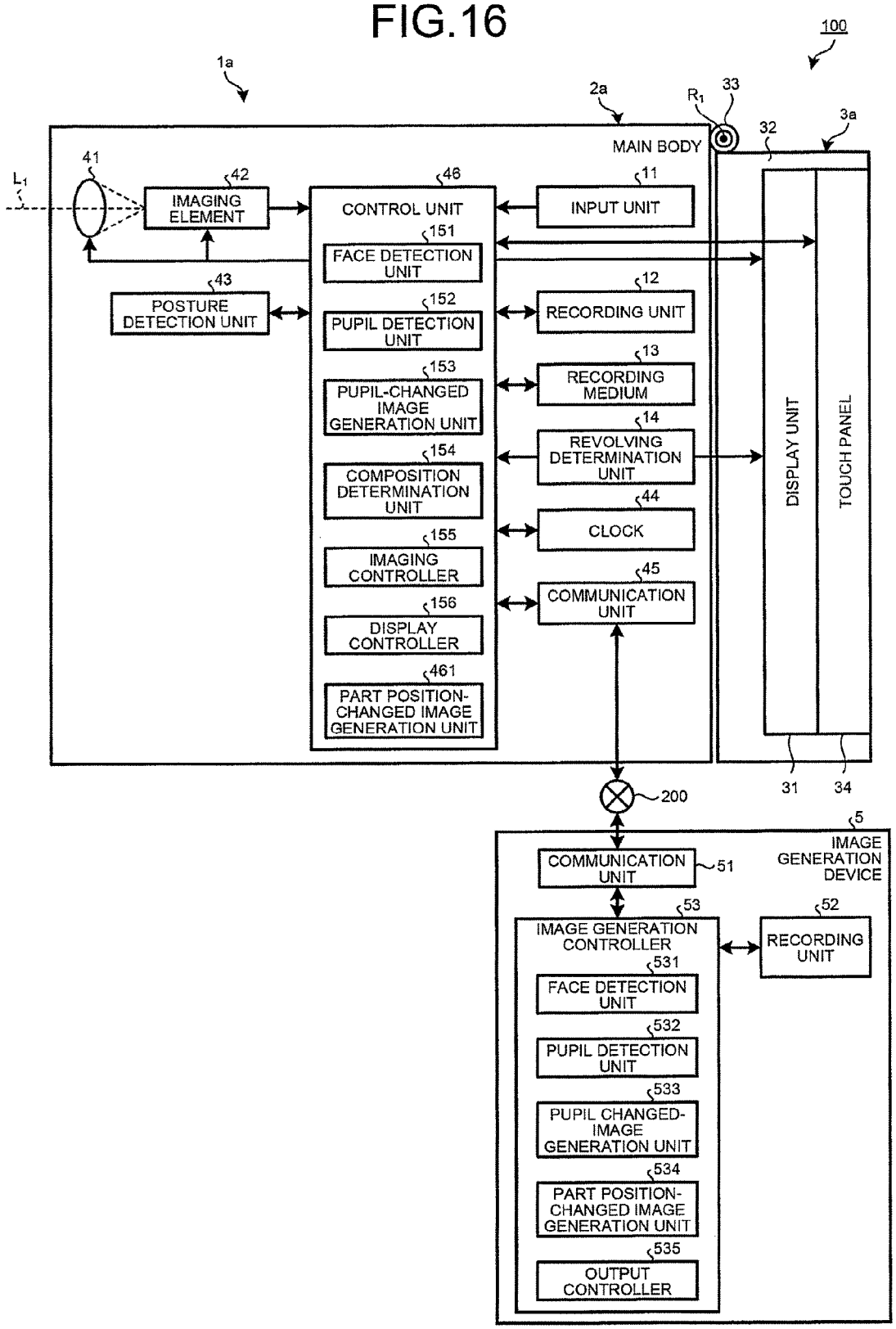
FIG. 16 is a block diagram illustrating a functional configuration of a display system according to a third embodiment of the present invention.

FIG. 16 is a block diagram illustrating a functional configuration of a display system according to the third embodiment. A display system 100 illustrated in FIG. 16 includes an imaging device 1a, and an image generation device 5 as an external device that receives image data from an outside through a network 200, and generates an image corresponding to the received image data.

The image generation device 5 includes a communication unit 51 that bidirectionally performs communication with an outside through the network 200, a recording unit 52 that records the image data generated by the image generation device 5 and various programs, and an image generation controller 53 that transfers instructions and data corresponding to respective units that configure the image generation device 5 to comprehensively control an operation of the image generation device 5.

The communication unit 51 performs communication with an external device according to specified communication standards to receive/transmit an image file including the image data.

The recording unit 52 records the image data input through the image generation controller 53, information in processing by the image generation device 5, various programs for operating the image generation device 5, a program according to the third embodiment, and various data used during execution of the program.

The image generation controller 53 includes a face detection unit 531, a pupil detection unit 532, a pupil-changed image generation unit 533, a part position-changed image generation unit 534, and an output controller 535.

The face detection unit 531 detects a face of an object in an image corresponding to the image data received through the network 200 and the communication unit 51. To be specific, the face detection unit 531 detects a face of a person included in the image corresponding to the image data by pattern matching. For example, the face detection unit 531 detects a position of the face in the image using the pattern matching, and then detects positions of characteristic points of the face, such as eyes, a nose, and a mouse, thereby to detect a position of the face, a size (an area) of the face, a direction of the face, an angle (an inclination) of the face, and an expression of the face (for example, a smiling face). Note that the face detection unit 531 may detect not only a face of a person, but also a face of an animal, such as a dog or a cat. Further, the face detection unit 531 may detect a face of a person using a known technology other than the pattern matching.

The pupil detection unit 532 detects pupils of the face of the object detected by the face detection unit 531. To be specific, the pupil detection unit 532 applies specified processing, for example, grayscale processing to the eye (an eye area) of the face of the object detected by the face detection unit 531, and then performing binarization processing, thereby to detect the pupil (a pupil area).

The pupil-changed image generation unit 533 changes positions of the pupils in the eye area of the object based on a detection result detected by the pupil detection unit 532. To be specific, the pupil-changed image generation unit 533 applies trimming processing to the pupil area detected by the pupil detection unit 532 to generate a pupil image, and superimposes the pupil image on an area of white of the eye in the eye area and performs interpolation processing of interpolating pixels of white or of a surrounding area of white of the eye in the pupil area subjected to the trimming processing to generate image data. For example, the pupil-changed image generation unit 533 generates two image data in which the objects having the pupils moved to the right and left, respectively, appear, when the positions of the pupils of the object detected by the pupil detection unit 532 are in the front (in the center).

The part position-changed image generation unit 534 generates part changed-image data of the object, in which parts that configure the face detected by the face detection unit 531 are moved in arranging directions of the pupil areas in a sclera area changed by the pupil-changed image generation unit 533.

The output controller 535 transmits the pupil-changed image data generated by the pupil-changed image generation unit 533 or the part-changed image data generated by the part position-changed image generation unit 534 to the imaging device 1a through the communication unit 51 and the network 200, as models of advice on imaging at the time of capturing images by the imaging device 1a. Note that, in the third embodiment, the output controller 535 functions as an output unit.

Figure 17:
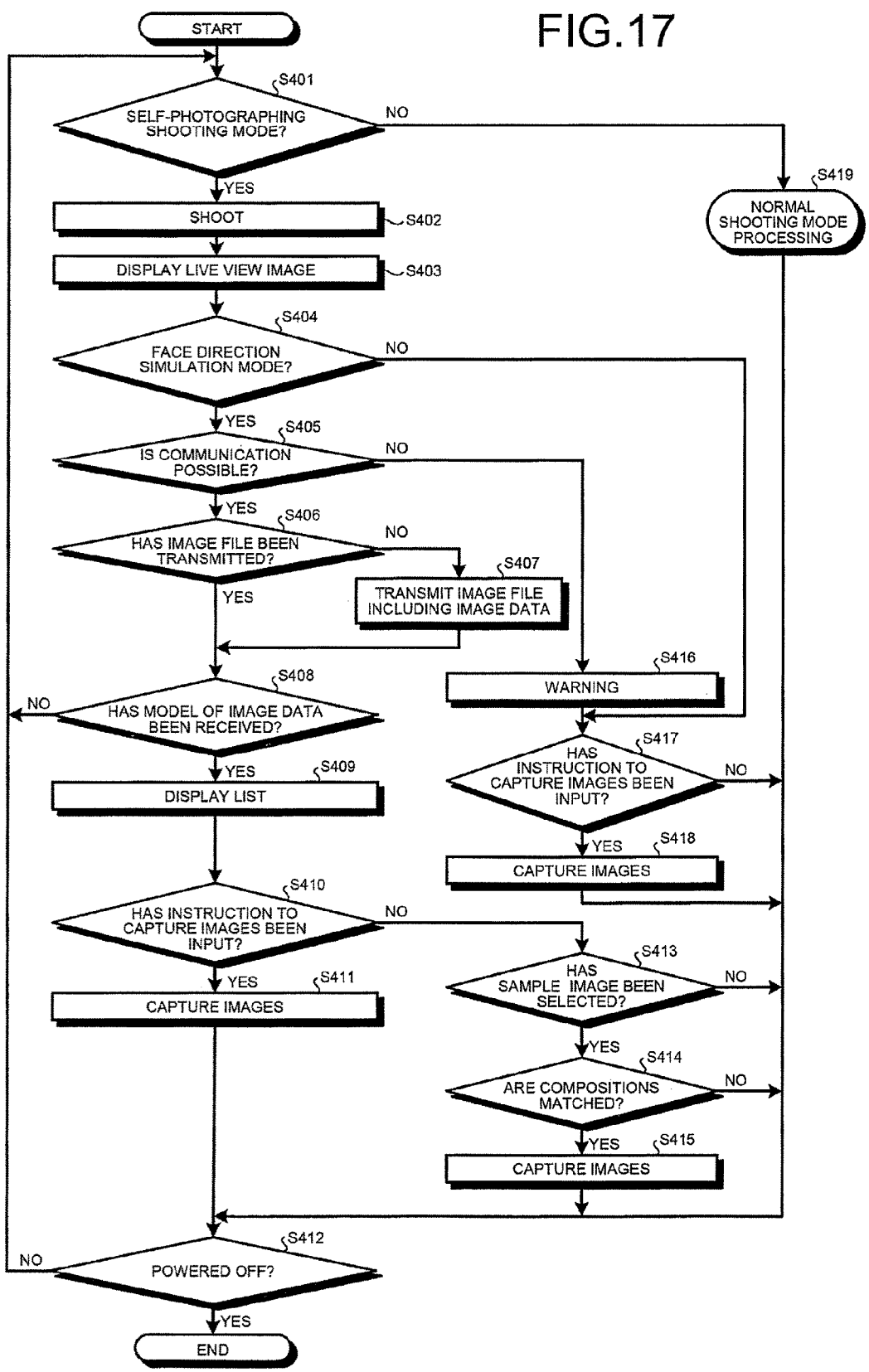
FIG. 17 is a flowchart illustrating an outline of processing executed by an imaging device according to the third embodiment of the present invention.

Processing of each of the imaging device 1a and the image generation device 5 of the display system 100 having the above configuration will be described. Processing executed by the imaging device 1a will be described first, and processing executed by the image generation device 5 will be described. FIG. 17 is a flowchart illustrating an outline of the processing executed by the imaging device 1a. In FIG. 17, steps S401 to S403 respectively correspond to steps S101 to S103 of FIG. 4 described above.

In step S404, when the imaging device 1a is set to a face direction simulation mode (Yes in step S404), the imaging device 1a proceeds to step S405 described below. In contrast, when the imaging device 1a is not set to the face direction simulation mode (No in step S404), the imaging device 1a proceeds to step S417 described below.

In step S405, when the imaging device 1a can communicate with the external image generation device 5 through a communication unit 45 and the network 200 (Yes in step S405), when the imaging device 1a has already transmitted the image file including the image data to the image generation device 5 (Yes in step S406), the imaging device 1a proceeds to step S408 described below.

Figure 18:
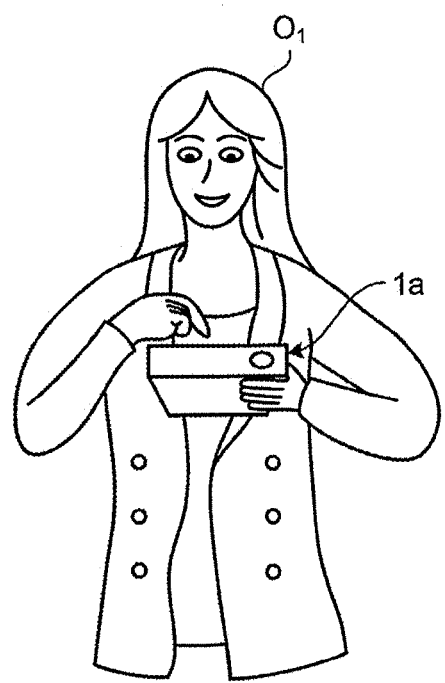
FIG. 18 is a diagram illustrating a state of when an image generation device is requested simulation in the imaging device according to the third embodiment of the present invention.

In step S405, when the imaging device 1a can communicate with the external image generation device 5 through the communication unit 45 and the network 200 (Yes in step S405), when the imaging device 1a has not yet transmitted the image file including the image data to the image generation device 5 (No in step S406), a control unit 46 transmits the image file including the image data generated by an imaging element 42 to the image generation device 5 through the communication unit 45 and the network 200 (step S407). For example, as illustrated in FIG. 18, an object $O_1$ selects a desired image of when requesting the image generation device 5 to perform simulation, from among a plurality of images displayed in a display unit 31, and operates the input unit 11 or a touch panel 34 to transmit an image file including image data to the image generation device 5. In the image file, instruction information for instructing contents of simulation, identification information for identifying the imaging device 1*a*, a focal distance of the imaging device 1*a*, and a virtual distance assuming a distance from the imaging device 1*a* to the object at a self-photographing shooting mode are stored, in addition to the image data.

Figure 19:
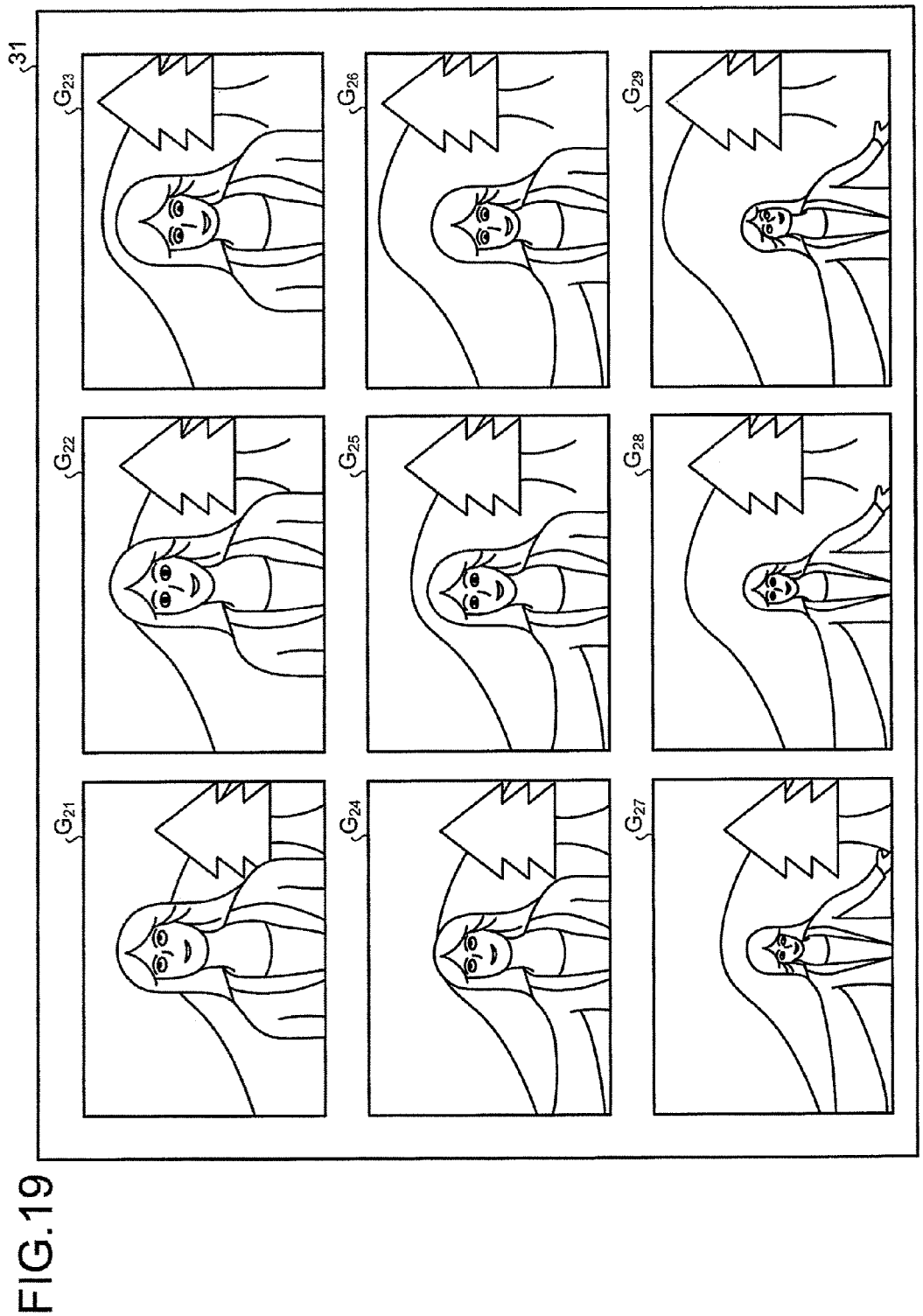
FIG. 19 is a diagram illustrating an example of images displayed in a display unit of the imaging device according to the third embodiment of the present invention.

Following that, when having received models of the image data in which compositions of faces of the object have been changed, from the image generation device 5 through the communication unit 45 and the network 200 (Yes in step S408), the display controller 156 causes the display unit 31 to display a list of images corresponding to the models of the image data (step S409). To be specific, as illustrated in FIG. 19, the display controller 156 displays, on the display unit 31, a plurality of sample images $G_{21}$ to $G_{29}$ corresponding to the models of the image data received from the image generation device 5 as shooting sample images. Accordingly, the photographer can virtually recognize own display and angles beyond expectation by confirming the images of the plurality of compositions (angles) displayed on the display unit 31 at the time of self-photographing shooting.

In step S408, if the models of the image data, in which compositions of the object have been changed, is not received from the image generation device 5 through the communication unit 45 and the network 200 (No in step S408), the imaging device 1*a* is returned to step S401.

In step S405, when the imaging device 1*a* cannot communicate with the external image generation device 5 through the communication unit 45 and the network 200 (No in step S405), the imaging device 1*a* proceeds to step S416.

Steps S410 to S419 respectively correspond to steps S110 to S119 of FIG. 4 described above.

Figure 20:
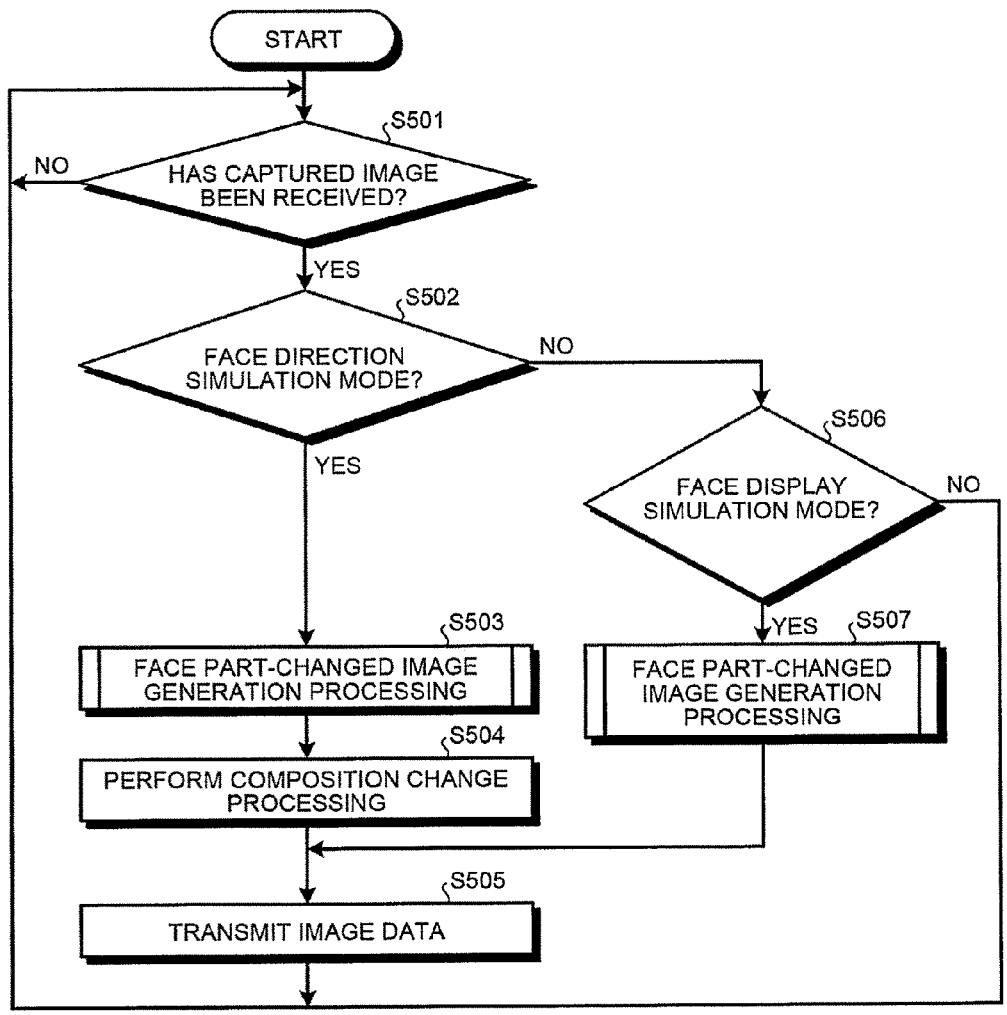
FIG. 20 is a flowchart illustrating an outline of processing executed by the image generation device according to the third embodiment of the present invention.

Next, processing executed by the image generation device 5 will be described. FIG. 20 is a flowchart illustrating an outline of processing executed by the image generation device 5.

As illustrated in FIG. 20, when having received an image file from the imaging device 1*a* or an external device through the network 200 and the communication unit 51 (Yes in step S501), the image generation device 5 proceeds to step S502 described below. In contrast, when having not received an image file from the imaging device 1*a* or an external device through the network 200 and the communication unit 51 (No in step S501), the image generation device 5 continues this judgment until the image generation device 5 receives image data.

In step S502, when instruction information that instructs simulation stored in the received image file is the face direction simulation mode (Yes in step S502), the image generation device 5 proceeds to step S503 described below. In contrast, when the instruction information that instructs simulation stored in the received image file is not the face direction simulation mode (No in step S502), the image generation device 5 proceeds to step S506 described below.

In step S503, the image generation device 5 executes the above-described face part-changed image generation processing of FIG. 11.

Next, the part position-changed image generation unit 534 executes composition change processing of changing a composition of the object with respect to each of a plurality of sample images corresponding to each of a plurality of image data generated by the face part changed-image generation processing (step S504).

Figure 21:
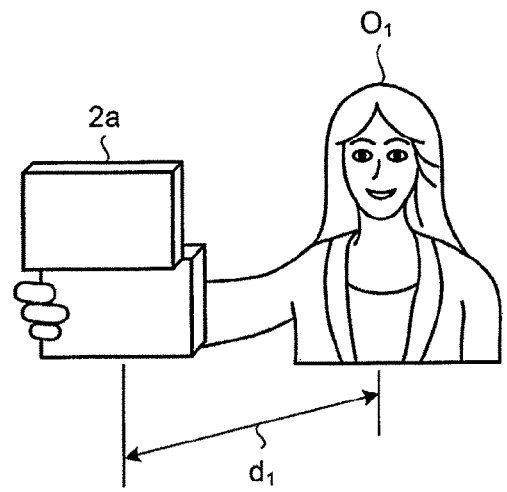
FIG. 21 is a diagram schematically illustrating a relationship between the imaging device and an object in a self-photographing shooting mode of the imaging device according to the third embodiment of the present invention.
Figure 22:
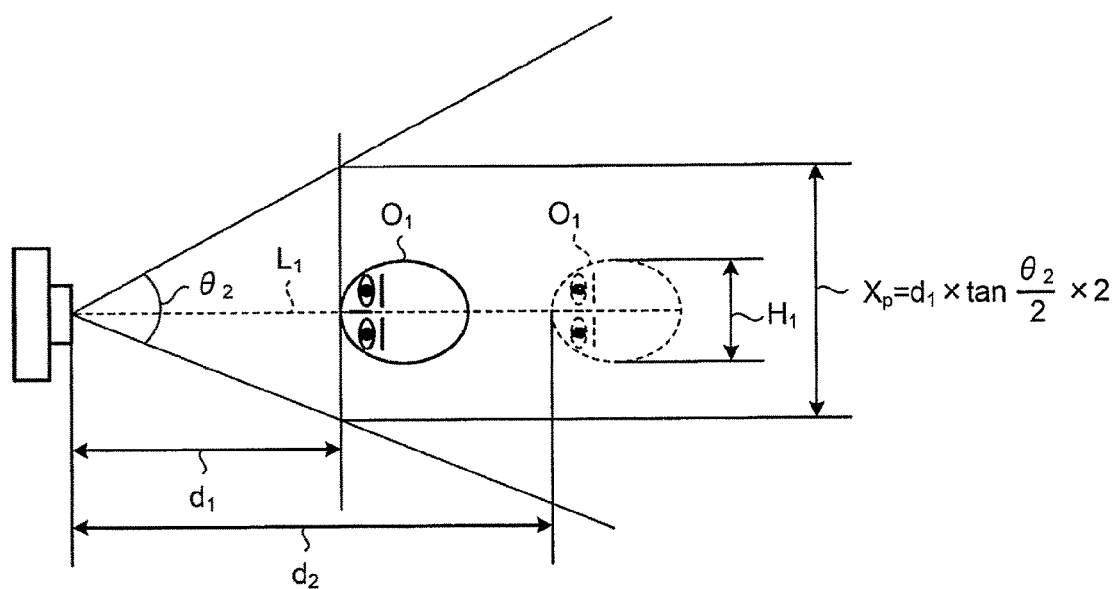
FIG. 22 is a diagram schematically illustrating a relationship between an angle of view of the imaging device and the object in a state illustrated in FIG. 21.
Figure 23:
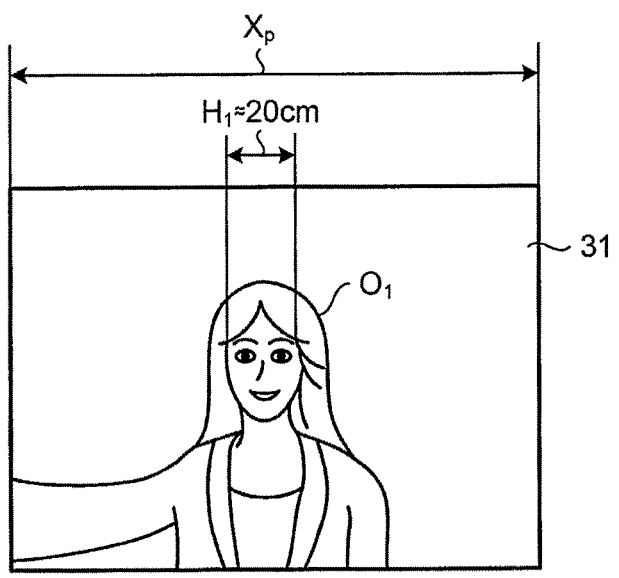
FIG. 23 is a diagram illustrating an example of an image corresponding to image data generated by the imaging device in the state illustrated in FIG. 21.

FIG. 21 is a diagram schematically illustrating a relationship between the imaging device 1*a* and the object (photographer) at the self-photographing shooting mode. FIG. 22 is a diagram schematically illustrating a relationship between an angle of view $\theta_2$ of the imaging device 1*a* and the object $O_1$ in a state of FIG. 21. FIG. 23 is a diagram illustrating an example of an image corresponding to image data generated by the imaging device 1*a* in the state of FIG. 21.

As illustrated in FIGS. 21 to 23, the part position-changed image generation unit 534 calculates a face area of the object $O_1$ in the image corresponding to the image data based on the identification information of the imaging device 1*a* stored in the image file, a focal distance of when the image data is captured, and an assumed distance $d_1$. To be specific, the part position-changed image generation unit 534 converts the length in the lateral direction in the display area of the display unit 31 into $X_p$ by the following formula (1):

$$X_p = d_1 \times \tan(\theta_2/2) \times 2 \qquad (1)$$

where the assumed distance is $d_1$ and the angle of view of the imaging device 1*a* is $\theta_2$.

Following that, the part position-changed image generation unit 534 generates sample images in which the object $O_1$ is changed in capturable compositions when the object $O_1$ stretches/shrinks his/her hand, as models of the advice on imaging, based on a ratio of a length $X_p$ in the lateral direction in the display area of the display unit 31 and a length $H_1$ (for example, 20 cm) in the lateral direction of the face of the object $O_1$ detected by the face detection unit 531. To be specific, as illustrated in FIG. 22, the part position-changed image generation unit 534 trims the object $O_1$ in the image, and generates, with respect to the trimmed object image, a sample image in which parts of the object $O_1$, such as the face, the arm, and the body, of when the distance from the imaging device 1*a* to the object $O_1$ is $d_2$, are reduced in size so that the ratio of the length $X_p$ and the length $H_1$ becomes small, and changed into a capturable composition when the object $O_1$ stretches his/her hand, as a model of the shooting sample image. Note that, in FIGS. 21 to 23, the description has been made using changing of the composition of the object $O_1$ as an example. However, the part position-changed image generation unit 534 may divide parts that configure the object $O_1$, and combines the divided parts to change a pose of the object $O_1$, and the like.

Following that the output controller 535 transmits the model of image data to the imaging device 1*a* through the communication unit 51 and the network 200 (step S505). After step S505, the image generation device 5 is returned to step S501.

In step S506, when the instruction information of simulation stored in the received image file is a face display simulation mode (Yes in step S506), the image generation device 5 executes the above-described face part-changed image generation processing of FIG. 11 (step S507). After step S507, the image generation device 5 proceeds to step S505.

In step S506, when the instruction information of simulation stored in the received image file is not the face display simulation mode (No in step S506), the image generation device 5 is returned to step S501.

According to the above-described third embodiment of the present invention, the sample image is generated by the image generation device 5, whereby the load applied to the imaging device 1*a* can be decreased.

Note that, while, in the third embodiment of the present invention, the image generation device 5 performs the composition changing processing of changing the composition of the object, the part position-changed image generation unit 461 of the imaging device 1*a* may perform similar composition changing processing.

Other Embodiments

Further, an imaging device according to the present invention can be applied to an electronic device, such as a digital camera, a digital video camera, a mobile phone having an imaging function, or a tablet-type mobile device, other than a digital single-lens reflex camera.

Further, an imaging device according to the present invention can be applied to an electronic device, such as a digital single-lens reflex camera, a digital video camera, a mobile phone having an imaging function, or a tablet-type mobile devices, to/from which lenses are attachable/detachable, other than a lens-integrated digital camera. Especially, since unnoticed charm and the like can be found out, the imaging device may be used as a mirror. That is, the imaging device according to the present invention can be used as a beauty instrument, a confirmation display device, a rehabilitation medical device as guidance use. Here, the description has been given using a single person. However, if this technology is applied to two persons, a camera that prompts shooting of a drama produced with directions of lines of sight or of faces of the two persons, postures of the two persons, and the like, can be obtained. Further, a guide device that prompts the two persons to look at each other or have expressions to have favorable communication, apart from the imaging device, can be provided.

Further, while the imaging device according to the present invention has the main body and the display unit integrally formed, the main body and the display unit may be separately configured. In this case, for example, the main body and the display unit may just be able to transmit image data and instruction data each other.

Further, the program executed by the imaging device of the present invention is recorded and provided as file data in an installable or executable format in a computer-readable recording medium, such as a CD-ROM, a flexible disc (FD), a CD-R, a digital versatile disk (DVD), a USB medium, or a flash memory.

Further, the program executed by the imaging device according to the present invention may be provided by being stored in a computer connected to a network, such as the Internet, and being downloaded through the network. Further, the program executed by the imaging device according to the present invention may be provided or distributed through the network, such as the Internet.

Note that, in the description of the flowcharts in the present specification, the sequence of the processing among the steps has been specified using the wording of "first", "then", "following that", and the like. However, the order of the processing necessary for implementing the present invention is not uniquely determined by such wording. That is, the order of the processing in the flowcharts described in the present specification can be changed without inconsistency.

According to some embodiments, it is possible to capture a desired expression at the time of capturing images.

As described above, the present invention may include various embodiments that are not described here, and various design changes, and the like may be made within the scope of the technical idea specified by claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device, comprising:
    an imaging device configured to capture an image of an object and to generate image data of the object;
    a display configured to display the image corresponding to the image data generated by the imaging device;
    a changed-image generation processor configured to generate a sample image from the image data in which at least a line of sight of the object has been changed from a front to a direction other than the front when the imaging device captures the image of the object;
    a display controller configured to cause the display to display the image and the sample image for comparison; and
    an input configured to receive input of an instruction signal for selecting one of the image and the sample image; wherein
    an imaging direction of the imaging device and a display direction of the display are matched.

2. The display device according to claim 1, further comprising:
    a face detection processor configured to detect a face of the object in the image corresponding to the image data generated by the imaging device;
    a pupil detection processor configured to detect a sclera area of eyes and a pupil area of the eyes in the face detected by the face detection processor; and
    the changed-image generation processor comprises a pupil-changed image generation processor configured to generate pupil-changed image data in which a position of the pupil area in the sclera area has been changed, based on a detection result by the pupil detection processor, wherein
    the display controller is configured to cause the display to display, as the sample image, a pupil-changed image corresponding to the pupil-changed image data generated by the pupil-changed image generation processor.

3. The display device according to claim 2, wherein the changed-image generation processor comprises a part position-changed image generation processor configured to generate part-changed image data of the object in which parts constituting the face detected by the face detection processor have been moved in an arranging direction of the pupil area in the sclera area changed by the pupil-changed image generation processor, wherein
    the display controller is configured to cause the display to display, as the sample image, a part-changed image corresponding to the part-changed image data generated by the part position-changed image generation processor.

4. The display device according to claim 2, wherein the changed-image generation processor comprises a part position-changed image generation processor configured to generate part-changed image data of the object in which parts constituting the face detected by the face detection processor have been reduced or enlarged depending on a predefined distance between the display device and the object, wherein
    the display controller is configured to cause the display to display, as the sample image, a part-changed image corresponding to the part-changed image data generated by the part position-changed image generation processor.

5. The display device according to claim 2, further comprising:
the input is configured to receive input of an instruction signal for selecting the sample image displayed on the display;
a composition determination processor configured to determine whether or not a composition of the object selected by the instruction signal received by the input and a composition of the object corresponding to the image data generated by the imaging device are matched; and
an imaging controller configured to cause the imaging device to capture images when the composition determination processor determines that the composition of the object in the selected sample image and the composition of the object corresponding to the image data generated by the imaging device are matched.

6. A display device comprising:
an imaging device configured to capture an image of an object and to generate image data of the object;
a display configured to display the image corresponding to the image data generated by the imaging device; and
a display controller configured to cause the display to display a sample image in which at least a line of sight of the object has been changed from a front to a direction other than the front when the imaging device captures the image of the object;
a composition determination processor configured to determine whether or not a composition of the object in the sample image and a composition of the object corresponding to the image data generated by the imaging device are matched; and
an imaging controller configured to cause the imaging device to capture images when the composition determination processor determines that the composition of the object in the sample image and the composition of the object corresponding to the image data generated by the imaging device are matched; wherein
an imaging direction of the imaging device and a display direction of the display are matched.

7. The display device according to claim 1, wherein
the display includes a display area that is turnably provided on a main body of the display device from a back surface side of the display device toward a front surface side of the display device, and is configured to display the image corresponding to the image data, and
the display controller is configured to cause the display to display the sample image when the display turns to the front surface side and the display area is on the front surface side.

8. A display method executed by a display device that includes: an imaging device configured to capture an image of an object and to generate image data of the object; and a display configured to display the image corresponding to the image data generated by the imaging device, wherein an imaging direction of the imaging device and a display direction of the display are matched,
the method comprising a displaying steps of:
generating a sample image from the image data in which at least a line of sight of the object has been changed from a front to a direction other than the front when the imaging device captures the image of the object;
displaying, on the display, the image and the sample image for comparison; and
receiving an instruction signal from an input for selecting one of the image and the sample image displayed on the display.

9. A non-transitory computer readable recording medium with an executable program stored thereon, the program instructing a display device to:
communicate with an imaging device to capture an image of an object and to generate image data of the object; and
communicate with a display to display the image corresponding to the image data generated by the imaging device, wherein an imaging direction of the imaging device and a display direction of the display are matched,
generate a sample image from the image data in which at least a line of sight of the object has been changed from a front to a direction other than the front when the imaging device captures the image of the object;
display, on the display, the image and the sample image for comparison; and
receive an instruction signal from an input for selecting one of the image and the sample image displayed on the display.

* * * * *